(12) United States Patent
Aoyagi et al.

(10) Patent No.: US 8,317,110 B2
(45) Date of Patent: Nov. 27, 2012

(54) WATER-AND-HOT-WATER MIXING DEVICE

(75) Inventors: Kenichi Aoyagi, Kitakyushu (JP);
Hiroshi Kanemaru, Kitakyushu (JP);
Tsuyoshi Miura, Kitakyushu (JP);
Masayuki Oba, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 656 days.

(21) Appl. No.: 12/565,221

(22) Filed: Sep. 23, 2009

(65) Prior Publication Data

US 2010/0078491 A1    Apr. 1, 2010

(30) Foreign Application Priority Data

Sep. 26, 2008  (JP) .................. 2008-249170
Jul. 13, 2009   (JP) .................. 2009-165146

(51) Int. Cl.
*G05D 23/13*  (2006.01)
*E03C 1/04*   (2006.01)
*F16K 31/48*  (2006.01)

(52) U.S. Cl. ............ 236/12.12; 4/676; 137/624.11

(58) Field of Classification Search ........... 236/12.12, 236/12.14; 4/676, 677; 137/624.11
See application file for complete search history.

(56) References Cited

U.S. PATENT DOCUMENTS 4,768,705 A   9/1988  Tsutsui et al.
6,676,024 B1  1/2004  McNerney et al.

FOREIGN PATENT DOCUMENTS

JP    5-233075    9/1993
JP    7-018508    1/1995

*Primary Examiner* — Chen Wen Jiang
(74) *Attorney, Agent, or Firm* — Jordan and Hamburg LLP

(57) ABSTRACT

A water-and-hot-water mixing device includes a mixing valve unit which mixes hot water and water and discharges mixed water therefrom, an operation part which sets a predetermined temperature, a mixed water thermistor which detects a temperature of mixed water, a hot-water thermistor which detects a temperature of hot water supplied to the mixing valve unit, and a controller which performs a feedback control of a discharge water temperature by controlling the mixing valve unit. The controller starts the feedback control when the controller determines that a change amount of the temperature of the hot water per unit time detected by the hot-water thermistor is not more than a fixed value and the temperature of the hot water detected by the hot-water thermistor is not lower than the predetermined temperature.

8 Claims, 20 Drawing Sheets

WATER-AND-HOT-WATER MIXING DEVICE

CROSS-REFERENCE TO RELATED APPLICATION(S)

This application is based on and claims the benefit of priority from Japanese Patent Application No. 2008-249170 filed on Sep. 26, 2008 and Japanese Patent Application No. 2009-165146 filed on Jul. 13, 2009; the entire contents of which are incorporated herein by reference.

BACKGROUND

1. Field

The present invention relates to a water-and-hot-water mixing device for obtaining mixed water of an adjusted temperature by mixing hot water and water supplied to the water-and-hot-water mixing device by way of predetermined flow passages.

2. Description of the Related Art

In general, for example, a washbowl cabinet or the like is provided with a water-and-hot-water mixing device for obtaining mixed water of an adjusted temperature. According to such a water-and-hot-water mixing device, hot water and water supplied by way of predetermined flow passages are mixed together and mixed water whose temperature is adjusted is supplied to a faucet body provided to a washbowl cabinet or the like. That is, with respect to mixed water which is discharged from a spout of the faucet body, the adjustment of temperature and flow rate and the changeover of discharge/stop of water (flow-out and stop of flow-out of water or hot water) are performed by the water-and-hot-water mixing device. Here, the adjustment of temperature and flow rate of mixed water discharged from the spout of the faucet body, and the changeover of discharge/stop of water are performed by operating an operation part arranged in the vicinity of the faucet body provided to the water-and-hot-water mixing device or the like.

Such a water-and-hot-water mixing device includes a mixing valve unit which suitably mixes hot water supplied by way of a hot water supply pipe connected to a hot water supply device and water supplied by way of a water supply pipe communicated with a service water pipe for controlling a temperature of mixed water. On a downstream side (downstream) of the mixing valve unit, an open/close flow rate adjusting valve which performs the open/close flow rate adjustment is arranged. The water-and-hot-water mixing device is also configured to discharge mixed water of a predetermined temperature from the faucet body due to an operation of an open/close flow-rate adjusting valve. That is, in the water-and-hot-water mixing device, the mixing valve unit is driven by an operation part via a predetermined control part so as to perform the water-and-hot-water mixing adjustment to obtain water of an appropriate temperature; and a flow rate of mixed water to be discharged is adjusted to a predetermined flow rate by a fixed flow rate adjusting part. Due to such an operation, the discharge of mixed water of a predetermined temperature and a predetermined flow rate from the faucet body becomes possible. The mixing valve unit is associated with temperature adjustment of mixed water by operating a valve element for adjusting opening of inlet for hot water and opening of inlet for water. The valve element provided to the mixing valve unit is operated by an electric drive source such as a motor.

The water-and-hot-water mixing device also includes the following constitution. That is, for adjusting the predetermined temperature of hot water supplied from the hot water supply device, to a middle portion of the hot water supply pipe connected to the hot water supply device, a supplied hot water temperature detector such as a thermistor which detects a temperature of hot water supplied from the hot water supply device is provided. Further, in a middle portion of a water discharge pipe between the fixed flow rate adjusting part and the faucet body, a mixed water temperature detector such as a thermistor which detects a temperature of mixed water is provided. These supplied hot water temperature detector and the mixed water temperature detector are connected to the control part. Further, the control part is connected to a drive source of the mixing valve unit and a flow rate adjusting device for performing the flow rate adjustment. Due to such a constitution, the water-and-hot-water mixing device is configured to perform mixing of water and hot water and the adjustment of the discharge water flow rate by driving the respective devices in response to instructions from the control part.

Then, in the water-and-hot-water mixing device which includes such a mixing valve unit, a feedback control is applied to discharge water temperature (temperature of mixture of water and hot water produced by the mixing valve unit). In this feedback control, the control part performs the comparison calculation of data from the mixed water temperature detector and data on a target temperature (temperature set by the operation part). Based on the result of the comparison calculation, the mixing valve unit is driven in response to instructions outputted from the control part, mixed water of predetermined appropriate temperature is discharged from the faucet body. To be more specific, in the feedback control of the discharge water temperature, the discharge water temperature is detected by the mixed water temperature detector. Then, the detected discharge water temperature is compared with the target temperature, and the mixing valve unit is controlled based on the difference between the detected discharge water and the target temperature. That is, in the mixing valve unit, the drive source such as the motor is controlled corresponding to a magnitude of the difference between the detected discharge water temperature and the target temperature so that the valve element is moved so as to eliminate a gap between the detected discharge water temperature and the target temperature. Due to such a feedback control, the discharge water temperature is constantly corrected aiming at the target temperature.

As the water-and-hot-water mixing device which performs such a feedback control, there has been known a water-and-hot-water mixing device described in JP-A-5-233075 (patent document 1), for example. In the water-and-hot-water mixing device described in patent document 1, when hot water is again supplied from a hot water supply device for discharging mixed water again from a faucet body, data on temperature of supplied hot water detected by a supplied-hot-water temperature detector in a previous hot-water discharge time is constantly stored in a control part, and a water-and-hot-water mixing ratio of a mixing valve unit is maintained in a previous stopped state until the data on temperature of supplied hot water approaches newest updated data or until a preliminarily set fixed time elapses irrelevant to monitoring of the newest updated data. Thereafter, the water-and-hot-water mixing device performs a feedback control using a mixed water temperature detector such as a thermistor.

However, in the water-and-hot-water mixing device described in patent document 1, particularly, when the set temperature of the hot water supply device is set to a temperature lower than the set temperature set in the previous hot water discharge time, eventually, the water-and-hot-water mixing ratio is maintained in the previously set state within a fixed time. Accordingly, a feedback control is not started unless the fixed time elapses so that a temperature adjustment time is prolonged thus giving rise to a drawback that the temperature adjustment becomes cumbersome. That is, in the water-and-hot-water mixing device described in patent document 1, at the time of supplying hot water from the hot water supply device again, the water-and-hot-water mixing ratio of the mixing valve unit is maintained in a previous stopped state until the data on temperature of supplied hot water approaches newest updated data at the previous time of supplying hot water or until a preliminarily set fixed time elapses irrelevant to monitoring of the newest updated data. From above, in spite of a fact that the temperature of hot water supplied again is set lower than the temperature at the previous hot water discharge so that the temperature of supplied hot water supplied from the hot water supply device becomes a temperature which substantially corresponds to the predetermined temperature and is stable originally, a control of discharge water temperature by a feedback control is not performed until a fixed standby time elapses. As a result, there arises a drawback that a temperature adjustment start time is delayed.

Further, conventionally, the mixing valve unit is constituted of a valve element which moves in a mixing valve casing so as to change a flow rate of hot water and a flow rate of water, and a valve drive mechanism which drives the valve element. The mixing valve unit discharges mixed water of predetermined temperature by performing a feedback control of the valve drive mechanism. In such a mixing valve unit having the above-mentioned constitution, when high-temperature hot water is suddenly supplied from the hot water supply device before the feedback control is performed, the feedback control is not performed in time thus giving rise to a possibility that an overshoot phenomenon where high-temperature mixed water is discharged from the mixing valve unit occurs.

SUMMARY

The present invention has been made to overcome the above-mentioned drawbacks, and it is an object of the present invention to provide a water-and-hot-water mixing device which can make the adjustment time of discharge water temperature as short as possible and, at the same time, can prevent an overshoot phenomenon where high-temperature mixed water is discharged from a mixing valve unit.

According to a first aspect of the present invention, there is provided a water-and-hot-water mixing device which includes: a mixing valve which includes a valve element which is movably arranged in the mixing valve and is configured to regulate openings of respective inflow ports for hot water and water which are supplied to the mixing valve by way of predetermined flow passages corresponding to a position of the valve element in the moving direction of the valve element, and is configured to discharge mixed water made of the hot water and the water obtained by mixing the hot water and the water flown into the mixing valve from the inflow ports; a temperature setting operation part which is configured to set a predetermined temperature which is a target value with respect to a temperature of the mixed water; a temperature sensor which is configured to detect a temperature of the mixed water flown out from the mixing valve; a supply-hot-water temperature sensor which is configured to detect a temperature of the hot water supplied to the mixing valve; and a controller which is configured to perform a feedback control for controlling the mixing valve such that mixed water of the predetermined temperature is obtained as the mixed water by outputting a control signal for moving the valve element with respect to the mixing valve based on the predetermined temperature and a temperature of the mixed water detected by the temperature sensor, wherein the controller is configured to start the feedback control when the controller determines that a change amount of the temperature of the hot water per unit time detected by a hot-water supply temperature sensor is not more than a fixed value and the temperature of the hot water detected by the hot-water supply temperature sensor is not lower than the predetermined temperature.

According to a second aspect of the present invention, there is provided a water-and-hot-water mixing device which includes: a mixing valve which includes a valve element which is movably arranged in the mixing valve and is configured to adjust openings of respective inflow ports for hot water and water which are supplied to the mixing valve by way of predetermined flow passages corresponding to a position of the valve element in the moving direction of the valve element and a temperature sensing member which is configured to drive the valve element by applying a biasing force which is changed along with a temperature change of the mixed water obtained by mixing the hot water and the water flown into the mixing valve from the inflow ports to the valve element, and is configured to discharge the mixed water; a temperature setting operation part which is configured to set a predetermined temperature which is a target value with respect to a temperature of the mixed water; a temperature sensor which is configured to detect a temperature of the mixed water flown out from the mixing valve; a supply-hot-water temperature sensor which is configured to detect a temperature of the hot water supplied to the mixing valve; and a controller which is configured to perform a feedback control for controlling the mixing valve such that mixed water of the predetermined temperature is obtained as the mixed water by outputting a control signal for moving the valve element with respect to the mixing valve based on the predetermined temperature and a temperature of the mixed water detected by the temperature sensor, wherein the controller is configured to start the feedback control when the controller determines that a change amount of the temperature of the hot water per unit time detected by a hot-water supply temperature sensor is not more than a fixed value and the temperature of the hot water detected by the hot-water supply temperature sensor is not lower than the predetermined temperature.

In the water-and-hot-water mixing device having either one of the above-mentioned constitutions, it is preferable that the mixing valve includes a temperature sensing member which is configured to drive the valve element by applying a biasing force which is changed along with a temperature change of the mixed water, and the controller includes: a temperature correcting part which is configured to calculate a correction amount applied to the control signal which corresponds to the predetermined temperature corresponding to a magnitude of the difference between the predetermined temperature and a temperature detected by the temperature sensor based on an operation signal from the temperature setting operation part corresponding to the predetermined temperature and a detection signal from a temperature sensor such that the difference between the predetermined temperature and the temperature detected by the temperature sensor is decreased; and a correction amount adjusting part which is configured to adjust the correction amount by multiplying the correction amount by a predetermined coefficient corresponding to the number of calculation of the correction amount for every calculation of the correction amount by the temperature correcting part.

It is preferable that the correction amount adjusting part further multiplies the correction amount which is multiplied by the predetermined coefficient by a predetermined coefficient corresponding to a value of the predetermined temperature.

It is further preferable that the controller further includes a memory part which is configured to store the control signal corresponding to a position of the valve element in the predetermined direction where the predetermined temperature and the temperature detected by the temperature sensor agree with each other, and the controller is configured to control the mixing valve based on the control signal stored in the memory part when the predetermined temperature is changed.

According to the present invention, the adjustment time of discharge water temperature can be shortened as much as possible and, at the same time, it is possible to prevent an overshoot phenomenon where high-temperature mixed water is discharged from the mixing valve unit.

DESCRIPTION OF THE PREFERRED EMBODIMENTS

The present invention, in a water-and-hot-water mixing device having the constitution which enables a feedback control based on the temperature deviation between a temperature set with respect to a discharge water temperature and a detected temperature, aims at shortening of an adjustment time of a discharge water temperature and the prevention of overshoot with respect to mixed water by starting a feedback control under predetermined conditions with respect to a temperature of hot water supplied by way of a predetermined flow passage. Hereinafter, embodiments of the present invention are explained.

First Embodiment

Figure 1:
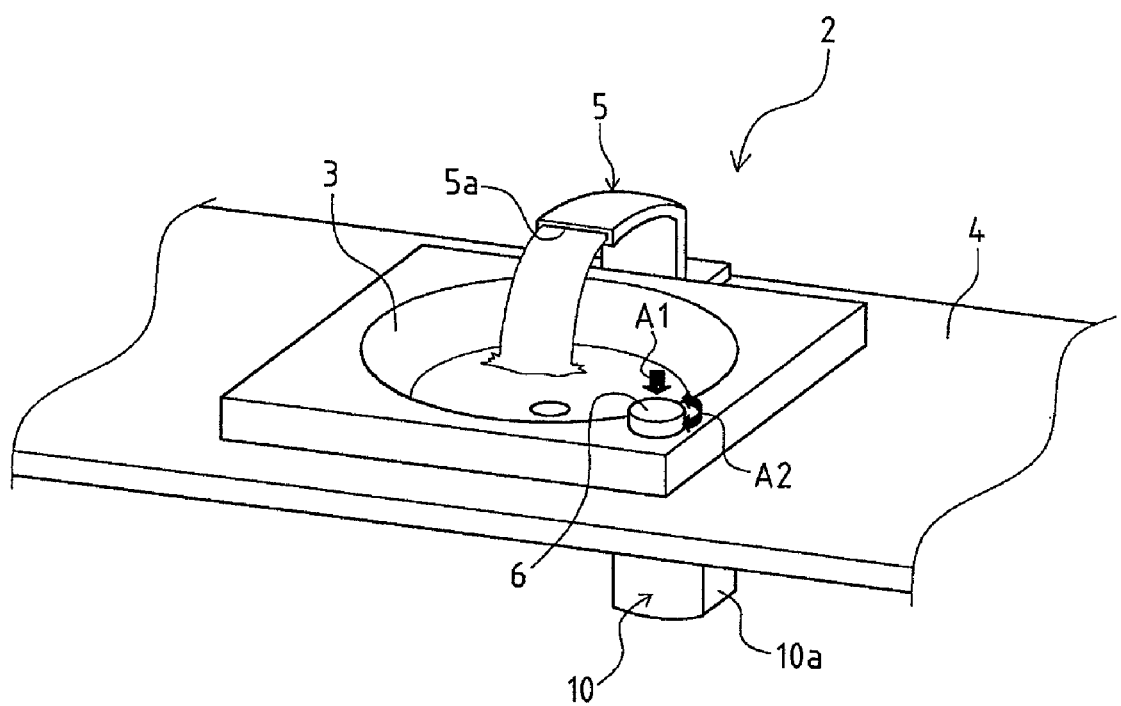
FIG. 1 is a perspective view showing the constitution of a washbowl cabinet provided with a water-and-hot-water mixing device according to the first embodiment of the present invention.

As shown in FIG. 1, the water-and-hot-water mixing device of this embodiment is mounted on a washbowl cabinet 2 which includes a washbowl 3. In the washbowl cabinet 2, the washbowl 3 is mounted on a washbowl counter 4. The washbowl cabinet 2 includes a faucet body 5 which constitutes a spout for discharging mixed water to the washbowl 3. The faucet body 5 includes a discharge opening 5a for discharging mixed water, and mixed water is discharged to the inside of the washbowl 3 from the discharge opening 5a.

The washbowl cabinet 2 includes an operation part 6 for performing an operation relating to mixed water discharged from the discharge opening 5a of the faucet body 5. In this embodiment, the operation part 6 is mounted on the washbowl cabinet 2 in a state that the operation part 6 is arranged on a flange portion (outer peripheral portion) of the washbowl 3. The operation part 6 is operated so as to perform the adjustment of a temperature and a flow rate of mixed water discharged from the discharge opening 5a of the faucet body 5 and the changeover of discharge/stop of discharged water (flow-out of mixed water and stop of flow-out of mixed water) are performed.

To be more specific, the operation part 6 is constituted of a handle-shaped portion which enables a pushing operation (see an arrow A1 in FIG. 1) and a rotary operation (see an arrow A2 in FIG. 1). Due to a pushing operation of the operation part 6, the changeover of the discharge/stop of water and the adjustment of a flow rate of mixed water are performed. On the other hand, due to a rotary operation of the operation part 6, the adjustment of a temperature of mixed water is performed. Further, the washbowl cabinet 2 includes a functional part 10 which constitutes the water-and-hot-water mixing device of this embodiment below a washbowl counter 4. The functional part 10 is mounted on the washbowl cabinet 2 in a state that the functional part 10 is accommodated in the inside of a predetermined case 10a at a position below the washbowl counter 4.

As described above, the water-and-hot-water mixing device of this embodiment includes the faucet body 5, the operation part 6, and the functional part 10 which constitute the washbowl cabinet 2. Further, according to the water-and-hot-water mixing device of this embodiment, based on the operation of the operation part 6, mixed water obtained by the functional part 10 is supplied to the faucet body 5 by way of a predetermined flow passage and is discharged from the discharge opening 5a.

Figure 2:
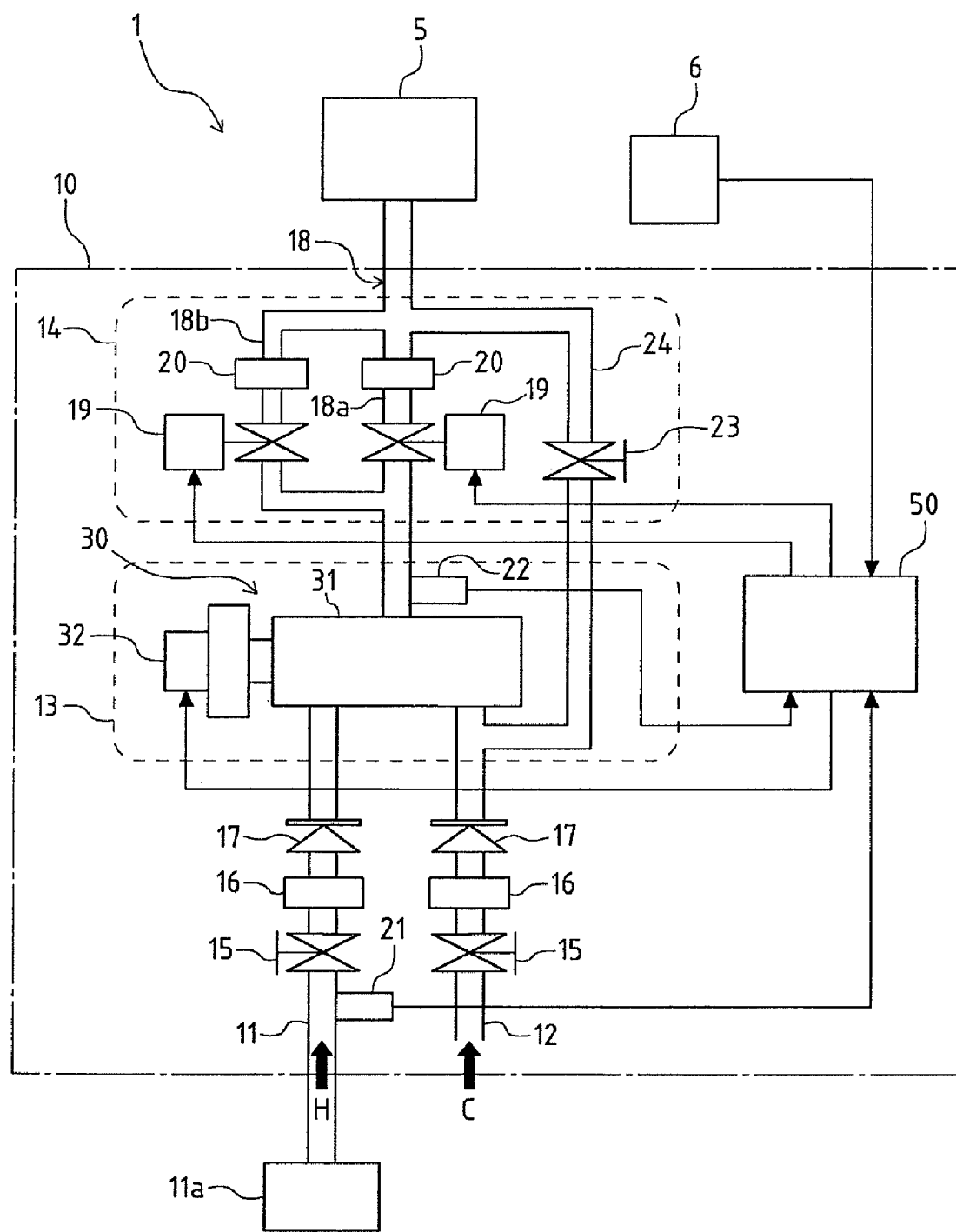
FIG. 2 is a block diagram showing the constitution of the water-and-hot-water mixing device according to the first embodiment of the present invention.

As shown in FIG. 2, the water-and-hot-water mixing device 1 of this embodiment is provided for obtaining mixed water whose temperature is adjusted by mixing hot water and water which are respectively supplied by way of predetermined flow passages. Accordingly, as shown in FIG. 2, the water-and-hot-water mixing device 1 includes, in the functional part 10, a hot-water supply pipe 11 which constitutes a supply pipe for hot water to be supplied by way of the predetermined flow passage and a water supply pipe 12 which constitutes a supply pipe for water to be supplied by way of the predetermined flow passage. To the hot water supply pipe 11, hot water obtained by a hot water supply unit 11a is supplied by way of a predetermined flow passage (see an arrow H). To the water supply pipe 12, water which is introduced from service water or the like is supplied by way of a predetermined flow passage (see an arrow C).

The functional part 10 is constituted of a temperature adjusting functional part 13 for adjusting a temperature of mixed water and a flow-rate adjusting functional part 14 for changing over the discharge/stop of discharged water and for adjusting a flow-rate of mixed water. These functional parts 13, 14 are arranged from an upstream side (a lower side in FIG. 2, hereinafter, simply referred to as an "upstream side") to a downstream side (an upper side in FIG. 2, hereinafter, simply referred to as a "downstream side") of the flow of hot water, water, and mixed water obtained by mixing hot water and water. That is, hot water and water supplied from the hot water supply pipe 11 and the water supply pipe 12 are mixed at the temperature adjusting functional part 13 thus producing mixed water whose temperature is adjusted and, thereafter, mixed water is supplied to the faucet body 5 by way of the flow-rate adjusting functional part 14.

The temperature adjusting functional part 13 is constituted of a mixing valve unit 30. Accordingly, the hot water supply pipe 11 and the water supply pipe 12 are respectively connected to the mixing valve unit 30. Then, hot water supplied from the hot water supply pipe 11 and water supplied from the water supply pipe 12 are mixed by the mixing valve unit 30 and, thereafter, mixed water is introduced into the flow-rate adjusting functional part 14. The mixing valve unit 30 includes a thermo-valve 31 and a motor 32 which functions as a drive source of the thermo-valve 31. The thermo-valve 31 is a mechanical thermo unit which includes a temperature sensing part for driving a valve member which the thermo-valve 31 includes by applying a biasing force which is changed in response to a temperature of mixed water to the valve member.

A stop valve 15, a filter 16 and a check valve 17 are mounted on the hot water supply pipe 11 and the water supply pipe 12 respectively in this order from an upstream side. The stop valve 15 is used when it is necessary to exchange parts of the functional part 10 or it is necessary to perform the maintenance of the functional part 10 or the like. The filter 16 is provided for removing impurities existing in hot water which flows into the hot water supply pipe 11 or water which flows into the water supply pipe 12. The check valve 17 is provided for restricting the flow of hot water which flows into the hot water supply pipe 11 and the flow of water which flows into the water supply pipe 12 respectively in the direction from the downstream side to the upstream side.

The flow-rate adjusting functional part 14 includes a water discharge pipe 18 constituting a passage for mixed water which is arranged between the mixing valve unit 30 and the faucet body 5. The water discharge pipe 18 includes a first branched pipe 18a and a second branched pipe 18b which are branched from each other. That is, the water discharge pipe 18 has an upstream-side end portion thereof connected to the mixing valve unit 30 and has a downstream-side end portion thereof connected to the faucet body 5. The water discharge pipe 18 also has the first branched pipe 18a and the second branched pipe 18b at an intermediate portion thereof, and these branched pipes 18a, 18b have downstream sides thereof merged to each other.

An solenoid valve 19 and a constant flow rate valve 20 are mounted on the first branched pipe 18a and the second branched pipe 18b respectively in this order from the upstream side. The solenoid valve 19 functions as an open/close valve. That is, the first branched pipe 18a and the second branched pipe 18b are changed over between a communication state and a non-communication state by performing opening/closing operations of the solenoid valve 19. The constant flow rate valve 20 restricts a flow rate of mixed water which flows into the first branched pipe 18a and the second branched pipe 18b respectively to a fixed flow rate.

In the flow-rate adjusting functional part 14 having such a constitution, the changeover of the discharge/stop of water and the adjustment of a flow rate of mixed water are performed as follows. In this embodiment, a flow rate of mixed water is adjusted by the flow-rate adjusting functional part 14 in two stages. To be more specific, the first branched pipe 18a and the second branched pipe 18b differ from each other in a flow rate of mixed water which flows into the first branched pipe 18a and the second branched pipe 18b due to the difference in flow rate restricted by changing a size of a pipe diameter or by providing a constant flow rate valve 20 or the like. In this embodiment, a flow rate of mixed water which flows into the first branched pipe 18a is set larger than a flow rate of mixed water which flows into the second branched pipe 18b.

Further, the adjustment of a flow rate of mixed water by the flow rate adjusting functional part 14 provides two states consisting of a state where both the first branched pipe 18a and the second branched pipe 18b allow the communication between the mixing valve unit 30 and the faucet body 5 (the solenoid valve 19 being opened) and a state where the second branched pipe 18b does not allow the communication between the mixing valve unit 30 and the faucet body 5 (the solenoid valve 19 being closed) and only the first branched pipe 18a allows the communication between the mixing valve unit 30 and the faucet body 5. That is, with the use of the flow-rate adjusting functional part 14, it is possible to change over a flow rate of mixed water supplied to the faucet body 5 from the mixing valve unit 30 in two stages, that is, a flow rate of mixed water obtained by combining a flow rate of mixed water through the first branched pipe 18a and a flow rate of mixed water through the second branched pipe 18b (a large flow rate) and a flow rate of mixed water formed of only a flow rate of mixed water through the first branched pipe 18a (a small flow rate).

Accordingly, the changeover of the discharge/stop of mixed water by the flow rate adjusting functional part 14 in a large flow rate state is performed by opening/closing the solenoid valve 19 mounted on both the first branched pipe 18a and the second branched pipe 18b. On the other hand, in a small flow-rate state, the solenoid valve 19 mounted on the second branched pipe 18b is in a closed state and hence, the changeover of the discharge/stop of water is performed by opening/closing the solenoid valve 19 mounted on the first branched pipe 18a.

The changeover of the discharge/stop of discharged water and the adjustment of a flow rate of mixed water in the flow rate adjusting functional part 14 described above are performed when a user performs a pushing operation of the operation part 6. Here, the constitution of the flow rate adjusting functional part 14 is not limited to the above-mentioned constitution of this embodiment. That is, the constitution of a flow passage of mixed water (for example, the number of branched flow passages and the like) in the flow rate adjusting functional part 14, the number of flow-rate stages which are adjusted gradually and the like are suitably set depending on a purpose of use of the water-and-hot-water mixing device 1 or the like.

Further, the functional part 10 includes a hot-water thermistor 21 for detecting a temperature of hot water supplied through the hot water supply pipe 11 and a mixed water thermistor 22 for detecting a temperature of mixed water supplied to the faucet body 5 from the mixing valve unit 30. The hot-water thermistor 21 is mounted on the hot water supply pipe 11 at an arbitrary position of the hot water supply pipe 11. In this embodiment, the hot-water thermistor 21 is mounted on the hot water supply pipe 11 at a position upstream of the stop valve 15. Further, the mixed water thermistor 22 is mounted on the water discharge pipe 18 at an arbitrary position of the water discharge pipe 18. In this embodiment, the mixed water thermistor 22 is mounted on the water discharge pipe 18 at an upstream end portion of the water discharge pipe 18.

The functional part 10 includes a controller 50 for controlling respective parts of the water-and-hot-water mixing device 1. The controller 50 controls an operation (opening/closing operation) of the solenoid valves 19 which are mounted in both the first branched pipe 18a and the second branched pipe 18b respectively and an operation of the mixing valve unit 30 based on an operation of the operation part 6a and a temperature of mixed water detected by the mixed water thermistor 22 or the like. That is, to the controller 50, an operation signal from the operation part 6, a detection signal from the hot-water thermistor 21, and a detection signal from the mixed water thermistor 22 are inputted. Further, from the controller 50, a control signal to the respective solenoid valves 19 and a control signal to the mixing valve unit 30 (a motor 32 of the mixing valve unit 30) are outputted.

The controller 50 includes an input interface for receiving input signals from the operation part 6, the hot-water thermistor 21 and the mixed water thermistor 22, and an output interface for outputting control signals to the respective solenoid valves 19 and the mixing valve unit 30. Further, the controller 50 includes a portion for storing a flow rate, temperature and the like of mixed water which are set in accordance with a control program or the operation part 6, a portion for performing a predetermined calculation in accordance with the control program and the like. Here, to the controller 50, electricity is supplied by way of an AC adapter not shown in the drawing.

Further, the functional part 10 of this embodiment includes a bypass pipe 24 on which a manually-operated open/close valve 23 is mounted. The bypass pipe 24 supplies water which is supplied to the water supply pipe 12 to the faucet body 5 such that the water bypasses the mixing valve unit 30 and the solenoid valves 19. That is, in this embodiment, the bypass pipe 24 is branched from the water supply pipe 12 at a position downstream of the check valve 17 and has a downstream-side end portion thereof connected to the water discharge pipe 18 (first branched pipe 18a) at a position downstream of the constant flow rate valve 20. The bypass pipe 24 is used for supplying water to the faucet body 5 in emergency such as power failure by manually operating the open/close valve 23.

Figure 3:
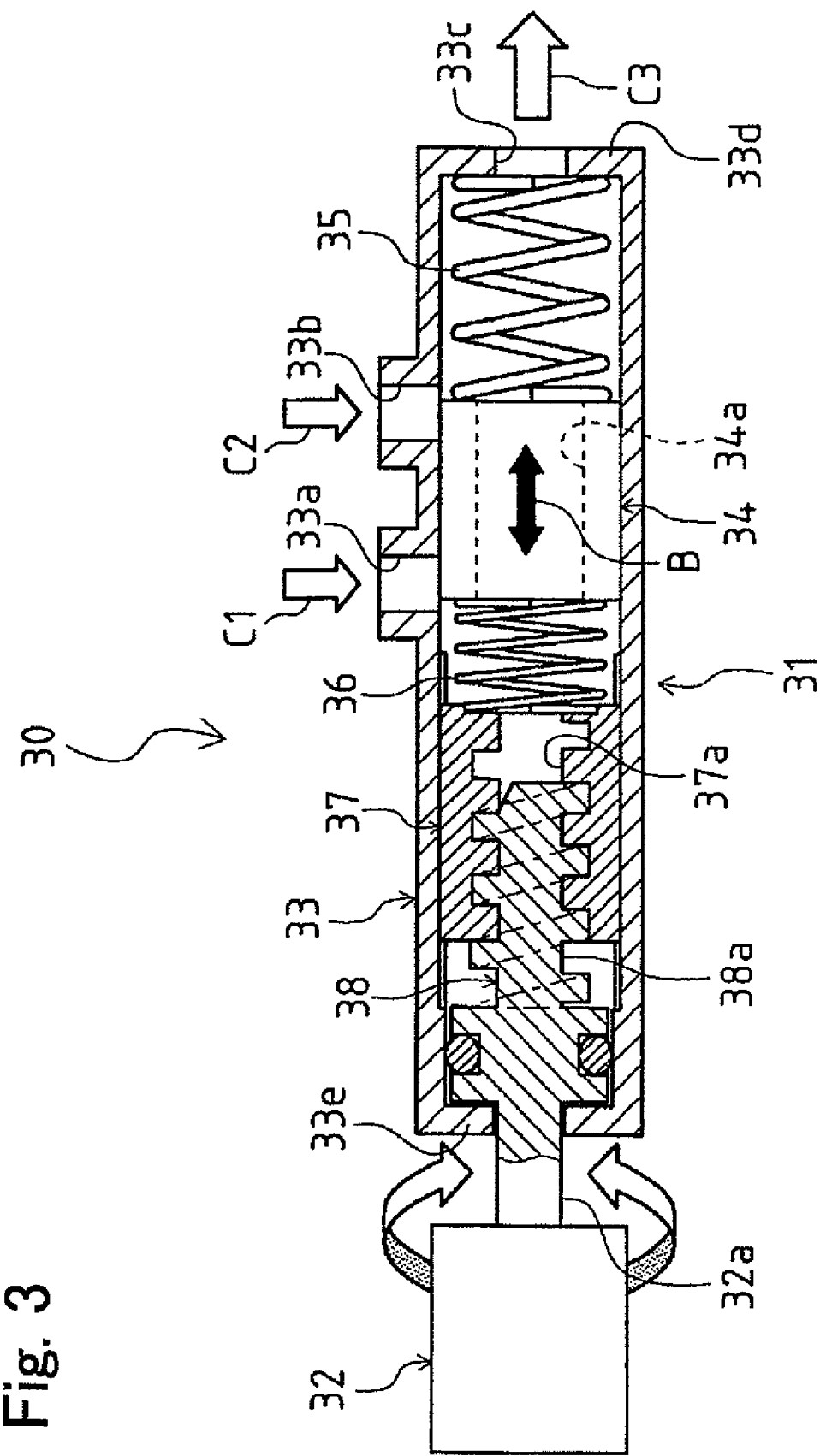
FIG. 3 is a partial cross-sectional view showing the constitution of a mixing valve unit according to the first embodiment of the present invention.

Next, the constitution of the mixing valve unit 30 is explained also in conjunction with FIG. 3. The mixing valve unit 30 includes the thermo-valve 31 and the motor 32 as described previously. As shown in FIG. 3, the thermo-valve 31 includes a substantially cylindrical-shaped casing 33, and a valve element 34 which is formed of a sleeve-shaped member and is housed in the casing 33. The valve element 34 has a profile (outer diameter size) which conforms to an inner peripheral surface of the casing 33 which defines an inner space in the casing 33. The valve element 34 is slidably arranged in the casing 33 such that the valve element 34 is slidable in extensible and retractable manner in the sleeve-axis direction of the casing 33 (in the longitudinal direction of the casing 33 in FIG. 3). Hereinafter, the extending and retracting direction (see an arrow B) of the valve element 34 in the casing 33 is referred to as the "valve moving direction".

Hot water which is supplied from the hot water supply pipe 11 and water which is supplied from the water supply pipe 12 flow into the inside of the casing 33 and are mixed. Accordingly, as shown in FIG. 3, the casing 33 includes a hot-water supply port 33a which constitutes an inflow port for hot water in the mixing valve unit 30, and a water supply port 33b which constitutes an inflow port for water in the mixing valve unit 30. The hot-water supply port 33a and the water supply port 33b allow the inner space of the casing 33 to be communicated with the outside. Accordingly, with respect to the hot water supply pipe 11 and the water supply pipe 12 which are connected to the mixing valve unit 30 as described above, the hot water supply pipe 11 is connected to the hot-water supply port 33a of the casing 33, and the water supply pipe 12 is connected to the water supply port 33b of the casing 33.

The valve element 34 controls a flow rate of hot water and water which flow into the casing 33 from the hot-water supply port 33a and the water supply port 33b by closing at least a portion of an opening portion of the hot-water supply port 33a which opens to the inside of the casing 33 and at least a portion of an opening portion of the water supply port 33b which opens to the inside of the casing 33 by an outer peripheral surface of the valve element 34. That is, the valve element 34 is movably arranged in the casing 33 in the valve moving direction within a predetermined range, and the valve element 34 changes an area thereof which closes the hot-water supply port 33a and an area thereof which closes the water supply port 33b corresponding to a position in the valve moving direction. Accordingly, the hot-water supply port 33a and the water supply port 33b are configured to adjust a degree of opening of the hot-water supply port 33a and a degree of opening of the water supply port 33b to the inner space of the casing 33 (an opening ratio between the hot-water supply port 33a and the water supply port 33b) by moving the valve element 34 in the valve moving direction.

When the degree of opening of the hot-water supply port 33a and the degree of opening of the water supply port 33b are changed due to the movement of the valve element 34 in the valve moving direction in the thermo-valve 31, a ratio of hot water and water which are mixed in the casing 33 (supplied to the inside of the casing 33) is changed. That is, a position of the valve element 34 in the valve moving direction is adjusted in the thermo-valve 31 so that a temperature of mixed water obtained by mixing hot water and water which flow into the thermo-valve 31 from the hot-water supply port 33a and the water supply port 33b (hereinafter, simply referred to as mixed water) is adjusted.

In the above-mentioned constitution, hot water which flows into the thermo-valve 31 from the hot-water supply port 33a (see an arrow C1) and water which flows into the thermo-valve 31 from the water supply port 33b (see an arrow C2) are mixed in the casing 33 due to the movement of the valve element 34 and form mixed water, and mixed water flows out from a flow-out port 33c which is formed in a predetermined portion of the casing 33 (see an arrow C3). In this embodiment, the flow-out port 33c is formed in a wall portion 33d which is provided to one end portion of the casing 33 in the longitudinal direction (on a right side in FIG. 3). Further, the valve element 34 which is a sleeve-shaped member has both sides thereof opened in the cylindrical axis direction, and the valve element 34 allows hot water to pass through a space defined by an inner peripheral surface 34a thereof.

As described above, in the water-and-hot-water mixing device 1 of this embodiment, the valve element 34 which is mounted in the mixing valve unit 30 is movably arranged in the valve moving direction and functions as a valve member for adjusting the degree of opening of the hot-water supply port 33a and the degree of opening of the water supply port 33b corresponding to a position in the moving direction of the valve element 34 (valve moving direction).

The valve element 34 is supported in the inside of the casing 33 in a state that the valve element 34 is biased from both sides in the valve moving direction. The valve element 34 is biased by a temperature sensing spring 35 on one side in the valve moving direction (on a side where the flow-out port 33c is formed) is, and the valve element 34 is biased by a bias spring 36 on the other side (on a side opposite to a side where the flow-out port 33c is formed) in the valve moving direction. These springs 35, 36 apply biasing forces to the valve element 34 by pushing in such a manner that the direction that the valve element 34 is driven by applying the biasing forces to the valve element 34 in the casing 33 becomes the valve element moving direction. That is, the biasing force (pushing force) of the temperature sensing spring 35 and the biasing force (pushing force) of the bias spring 36 which act on the valve element 34 counteract each other and the valve element 34 is moved to a position where the biasing force of the temperature sensing spring 35 and the biasing force of the bias spring 36 are balanced with each other. In the explanation made hereinafter, with respect to the valve moving direction (the longitudinal direction of the casing 33), a side where the temperature sensing spring 35 is positioned with respect to the valve element 34 (a right side in FIG. 3) is referred to as a "flow-out side", and a side opposite to the flow-out side (a side where the bias spring 36 is positioned, a left side in FIG. 3) is referred to as a "side opposite to flow-out side".

The temperature sensing spring 35 is a coil spring made of a shape memory alloy (SMA; Shape Memory Alloy), and changes a biasing force thereof which acts on the valve element 34 corresponding to a change of temperature thereof thus driving the valve element 34. That is, the temperature sensing spring 35 constitutes a temperature sensing part which drives the valve member incorporated in the thermo-valve 31 by applying a biasing force which changes corresponding to a temperature of mixed water to the valve member in the thermo-valve 31. In this embodiment, the biasing force of the temperature sensing spring 35 applied to the valve element 34 is increased along with the increase of the temperature of mixed water and is decreased along with the decrease of the temperature of mixed water. The temperature sensing spring 35 is arranged in the casing 33 in a state that the temperature sensing spring 35 is sandwiched between the wall portion 33d in which the flow-out port 33c is formed and the valve element 34.

The bias spring 36 is arranged in a state that the bias spring 36 is pushed by a spring pusher 37 which is arranged in the casing 33 and, at the same time, is sandwiched between the spring pusher 37 and the valve element 34. The spring pusher 37 is a substantially cylindrical-shaped member and is movably arranged in the valve moving direction.

A position of the bias spring 36 in the moving direction is determined by a spindle 38 which is arranged in the casing 33. To be more specific, a female thread portion 37a is formed on an inner peripheral surface of the spring pusher 37. A male thread portion 38a of the spindle 38 is threadedly engaged with the female thread portion 37a of the spring pusher 37. The spindle 38 is rotatably supported in the casing 33 at a predetermined position in the valve moving direction.

Accordingly, due to the rotation of the spindle 38 in the normal direction and in the reverse direction, the spring pusher 37 is moved toward both sides in the valve moving direction. That is, with respect to the biasing force which is applied to the valve element 34 from the bias spring 36, when the spring pusher 37 is moved toward the flow-out side (the spring pusher 37 approaching a valve element 37 side) along with the rotation of the spindle 38, the biasing force is increased. On the other hand, when the spring pusher 37 is moved toward the side opposite to the flow-out side (the spring pusher 37 moving away from the valve element 37 side) along with the rotation of the spindle 38, the biasing force is decreased.

The spindle 38 is rotated by a motor 32 which is mounted on the mixing valve unit 30 as a drive source. That is, the spindle 38 is connected to an output shaft 32a of the motor 32 and is rotated along with the rotation of the motor 32. A connecting portion between the output shaft 32a of the motor 32 and the spindle 38 penetrates a wall portion 33e of the casing 33 on the side opposite to flow-out side. Accordingly, the motor 32 is arranged on the side opposite to flow-out side of the casing 33, and transmits the rotation to the spindle 38 from the side opposite to flow-out side of the casing 33. Further, based on the rotational direction and a rotational amount (rotational angle) of the motor 32, a position of the spring pusher 37, that is, a magnitude of the biasing force which is applied to the valve element 34 due to the bias spring 36 is adjusted.

In the above-mentioned constitution, when the temperature of mixed water in the casing 33 is elevated so that a biasing force of the temperature sensing spring 35 exceeds a biasing force of the bias spring 36, the valve element 34 is moved to a side opposite to flow-out side against the biasing force of the bias spring 36 and arrives at a position where the biasing force of the temperature sensing spring 35 and the biasing force of the bias spring 36 balance with each other. The movement of the valve element 34 toward the side opposite to flow-out side corresponds to the movement of the valve element 34 in the direction where the hot-water supply port 33a is closed (or the opening portion is narrowed) and, at the same time, the water supply port 33b is opened (or the opening portion is widened). Due to such movement of the valve element 34, an amount of hot water which is supplied to the inside of the casing 33 is decreased and an amount of water supplied to the inside of the casing 33 is increased and hence, a temperature of mixed water is lowered.

On the other hand, when the temperature of mixed water in the casing 33 is lowered so that the biasing force of the temperature sensing spring 35 becomes smaller than the biasing force of the bias spring 36, the valve element 34 is moved toward the flow-out side against the biasing force of the temperature sensing spring 35, and the valve element 34 arrives at a position where the biasing force of the temperature sensing spring 35 and the biasing force of the bias spring 36 balance with each other. The movement of the valve element 34 toward the flow-out side corresponds to the movement of the valve element 34 in the direction where the hot-water supply port 33a is opened and, at the same time, the water supply port 33b is closed. Due to such movement of the valve element 34, an amount of hot water which is supplied to the inside of the casing 33 is increased and am amount of water supplied to the inside of the easing 33 is decreased and hence, the temperature of mixed water is elevated.

Further, the temperature of mixed water is also adjusted by the operation of the valve element 34 driven by the motor 32. That is, as described previously, when the biasing force of the bias spring 36 to the valve element 34 which is adjusted by the rotation of the motor 32 by way of the spindle 38 and the spring pusher 37 exceeds the biasing force of the temperature sensing spring 35, the valve element 34 is moved toward a flow-out side against the biasing force of the temperature sensing spring 35. On the other hand, when the biasing force of the bias spring 36 to the valve element 34 which is adjusted by the rotation of the motor 32 by way of the spindle 38 and the spring pusher 37 is smaller than the biasing force of the temperature sensing spring 35, the valve element 34 is moved toward a side opposite to flow-out side against the biasing force of the bias spring 36.

As described above, in the mixing valve unit 30, due to the operation of the valve element 34 caused by the change of the biasing force of the temperature sensing spring 35 corresponding to the change of a temperature of the temperature sensing spring 35 and the operation of the valve element 34 caused by driving the motor 32, the degree of opening of the hot-water supply port 33a and the degree of opening of the water supply port 33b are changed thus adjusting a temperature of mixed water. That is, the adjustment of the temperature of mixed water using the thermo-valve 31 includes the adjustment of mixed water by the operation of the valve element 34 using the motor 32 and the adjustment of mixed water using the temperature sensing spring 35 which drives the valve element 34 by applying the biasing force which is changed corresponding to the temperature of mixed water to the valve element 34. Further, the adjustment of the temperature of mixed water by the mixing valve unit 30 which constitutes the temperature adjusting functional part 13 is performed by the rotational operation of the operation part 6.

As described above, in the water-and-hot-water mixing device 1 of this embodiment, the temperature sensing spring 35 which is provided to the mixing valve unit 30 functions as a temperature sensing member which drives the valve element 34 (moves the valve element 34 in the valve moving direction in an extensible and retractable manner) by applying a biasing force which changes along with the temperature change of the mixed water to the valve element 34. That is, in the water-and-hot-water mixing device 1 of this embodiment, the mixing valve unit 30 functions as a mixing valve which includes the valve element 34 and the temperature sensing spring 35 and discharges mixed water.

Further, in the water-and-hot-water mixing device 1 of this embodiment, the operation part 6 (see FIG. 2) functions as a temperature setting operation part for setting a predetermined temperature which is a target temperature with respect to temperature of mixed water (hereinafter simply referred to as "predetermined temperature"). Further, the mixed water thermistor 22 functions as a temperature sensor for detecting temperature of mixed water flown out from the mixing valve unit 30, while supplied hot-water thermistor 21 functions as a hot-water supply temperature sensor for detecting temperature of hot water supplied to the mixing valve unit 30.

In the water-and-hot-water mixing device 1 of this embodiment, the controller 50 performs a feedback control of the mixing valve unit 30 in such a manner that the controller 50 outputs a control signal to the mixing valve unit 30 so as to move the valve element 34 whereby mixed water of predetermined temperature is obtained. Here, the control signal which is outputted to the mixing valve unit 30 from the controller 50 is a control signal supplied to the motor 32 for moving the valve element 34.

In the water-and-hot-water mixing device 1 having the above-mentioned constitution, the feedback control relating to the discharge water temperature (temperature of mixed water) is performed by the controller 50 such that the controller 50 controls the mixing valve unit 30 (motor 32 of the mixing valve unit 30) based on an operation signal from the operation part 6 and a detection signal from the mixed water thermistor 22. Hereinafter, a control signal which is outputted to the mixing valve unit 30 (motor 32 of the mixing valve unit 30) from the controller 50 is referred to as "valve control signal". That is, the valve control signal is a signal for rotating a spindle 38 which moves the valve element 34 in the valve moving direction due to the rotation thereof (see FIG. 3). Accordingly, the valve control signal is a signal with respect to a rotation angle of the spindle 38 (hereinafter referred to as "spindle angle") and the rotational direction.

In the feedback control, the discharge water temperature detected by the mixed water thermistor 22 (hereinafter referred to as "detection temperature") is compared to a target temperature (predetermined temperature set by the operation part 6), and the thermo-valve 31 is controlled based on the difference between the detection temperature and the predetermined temperature. That is, in the thermo-valve 31, by controlling the motor 32 corresponding to a magnitude of the difference between the detection temperature and the predetermined temperature, the valve element 34 is moved by way of the spindle 38 and the spring pusher 37 so as to eliminate a gap between the detection temperature and the predetermined temperature. Due to such an operation, the discharge water temperature is constantly corrected using the predetermined temperature as a target.

To be more specific, in the feedback control, the controller 50 performs a comparison calculation of the detection temperature and the predetermined temperature based on an operation signal from the operation part 6 and a detection signal from the mixed water thermistor 22, and generates a valve control signal based on a calculation result. When the detection temperature is lower than the predetermined temperature as the result of the comparison calculation, the controller 50 generates a valve control signal for elevating the discharge water temperature. On the other hand, when the detection temperature is higher than the predetermined temperature as the result of the comparison calculation, the controller 50 generates a valve control signal for lowering the discharge water temperature.

Here, the valve control signal which is generated by the controller 50 is calculated corresponding to a magnitude of the temperature difference of the detection temperature and the predetermined temperature. The calculation of the valve control signal by the controller 50 is performed based on the relationship between the predetermined temperature which is preliminarily set and stored in the controller 50 and the spindle angle, for example.

Further, in the water-and-hot-water mixing device 1 of this embodiment, the above-mentioned feedback control is applied to the temperature of hot water supplied from the hot water supply unit 11a through the hot water supply pipe 11 (hereinafter referred to as "hot-water supply temperature") under predetermined conditions. To be more specific, the feedback control is performed when a change amount of the hot-water supply temperature per unit time is not more than a fixed value and the hot-water supply temperature is not lower than the predetermined temperature. Accordingly, the controller 50 starts the feedback control when the controller 50 determines that a change amount of the hot-water supply temperature detected by the hot-water supply thermistor 21 per unit time is not more than a fixed value and the hot-water supply temperature is not lower than the predetermined temperature.

Figure 4:
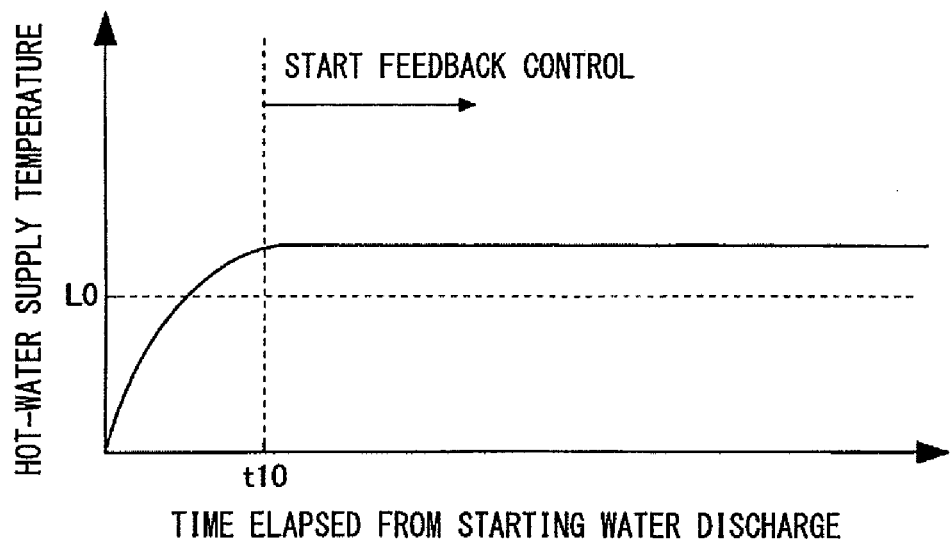
FIG. 4 is a graph showing one example of a change of supplied hot-water temperature with time.

FIG. 4 shows one example of a change with time of hot-water supply temperature from a point of time that the discharge of mixed water is started. In the graph shown in FIG. 4, time which elapses from a point of time that the discharge of mixed water is started is taken on an axis of abscissas, and the hot-water supply temperature is taken on an axis of ordinates. As shown in FIG. 4, the hot-water supply temperature takes some time (see t10) to become stable from the point of time that the discharge of mixed water is started because the hot-water supply temperature is generally influenced by dwelling water in a pipe from the hot water supply unit 11a which supplies hot water to the hot water supply pipe 11 and in the hot water supply unit 11a.

Accordingly, in the water-and-hot-water mixing device 1 of this embodiment, the start timing of the feedback control is set to a point of time that the hot-water supply temperature becomes stable and, at the same time, the hot-water supply temperature is not lower than the predetermined temperature (see FIG. 4, temperature L0). That is, the start timing of the feedback control is set to a point of time that the controller 50 determines that the hot-water supply temperature becomes stable and, at the same time, the hot-water supply temperature is not lower than the predetermined temperature. Here, with respect to a degree of stability of the hot-water supply temperature, whether or not a change amount of the hot-water supply temperature per unit time (hereinafter referred to as "hot-water supply temperature change amount") is not more than a fixed value is used as an index.

In this manner, by performing the feedback control under the predetermined conditions with respect to the hot-water supply temperature, the feedback control is performed in a state where the hot-water supply temperature is not lower than the predetermined temperature and the hot-water supply temperature is stable. Due to such an operation, it is possible to obtain mixed water of stable predetermined temperature within a shorter time.

The feedback control which is performed under the predetermined conditions with respect to the hot-water supply temperature is also applicable at the time of discharging mixed water again corresponding to the predetermined temperature, and is performed when the discharge of mixed water is started. That is, when the water-and-hot-water mixing device 1 of this embodiment is used, the discharge of mixed water of desired temperature and flow rate from the faucet body 5 is performed by operating the operation part 6. Accordingly, when the water discharge operation is completed and the discharge of mixed water is stopped, by operating the operation part 6, the solenoid valve 19 of the flow rate adjusting functional part 14 is closed by way of the controller 50 so that the discharge of mixed water from the faucet body 5 is stopped. Then, to consider a case where the discharge of hot water from the hot water supply unit 11a is started again after a fixed time elapses from a point of time that the discharge of mixed water is stopped, even when the setting of the discharge water temperature is maintained exactly equal to the setting of the discharge water temperature of the previous time or even when the discharge water temperature is newly set by the operation part 6, the controller 50 performs the feedback control when the controller 50 detects that the hot-water supply temperature change amount is not more than a fixed value and, at the same time, the hot-water supply temperature is not lower than the predetermined temperature. That is, at the time of starting the discharge of mixed water such as at the time of starting the discharge of mixed water again after a lapse of a fixed time from a water stop state, when the controller 50 determines that the hot-water supply temperature is stable and, at the same time, the hot-water supply temperature is not lower than the predetermined temperature, the controller 50 starts the feedback control corresponding to the predetermined time at such a point of time.

Figure 5:
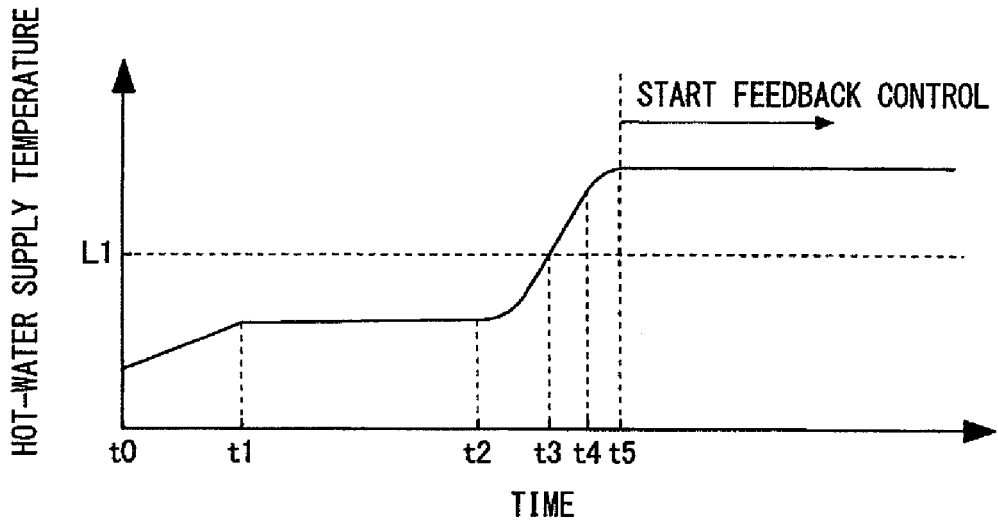
FIG. 5 is a graph showing one example of a change of detected supplied hot-water temperature with time.

The feedback control which is started under predetermined conditions with respect to the hot-water supply temperature is explained specifically. FIG. 5 shows an example of a change with time (timing chart) of the hot-water supply temperature detected by the hot water thermistor 21. As shown in FIG. 5, at a point of time that the water discharge starts (point of time: t0), being influenced by dwelling water in a hot water supply unit 11a or the like, the hot-water supply temperature is lower than a temperature L1 which is a predetermined temperature and is elevated at a predetermined inclination (point of time: t0 to point of time: t1). When the influence of the dwelling water in the hot water supply unit 11a starts to disappear, the detection of actual hot-water supply temperature starts and the hot water supply temperature soon exceeds the predetermined temperature (point of time: t2 to point of time: t3).

Figure 6:
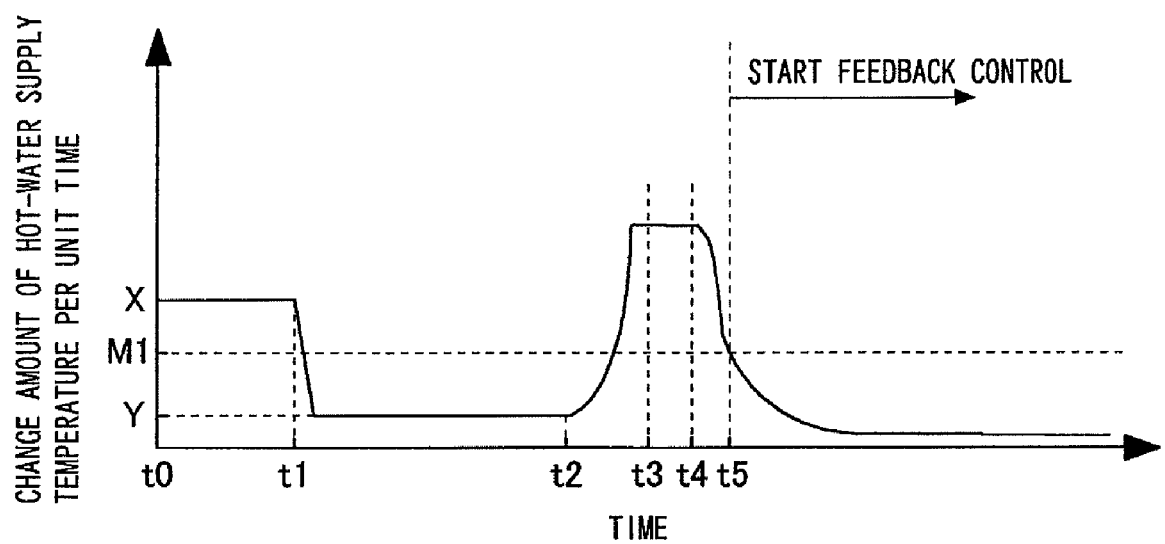
FIG. 6 is a graph showing one example of a change amount of the detected supplied hot-water temperature per unit time with time.

The controller 50 calculates a hot-water supply temperature change amount when water discharge starts. FIG. 6 shows one example of a change with time of the hot-water supply temperature change amount. A graph shown in FIG. 6 is obtained by the differentiation of the result expressed in the graph shown in FIG. 5. As shown in FIG. 6, during a period from the point of time t0 to the point of time t1 where the hot water supply temperature is elevated at the predetermined inclination, the hot water supply temperature change amount is set to an approximately constant predetermined value X. This value X of the hot water supply temperature change amount is larger than a hot water supply temperature change amount of a fixed value which becomes the reference of the hot water supply temperature change amount contained in conditions for starting the feedback control (hereinafter referred to as "reference change amount") M1.

Then, with respect to the change of hot water supply temperature up to the point of time t2, the hot water supply temperature is changed at the inclination smaller than the inclination up to the point of time t1 and hence, during a period from the point of time t1 to the point of time t2, a value Y of the hot water supply temperature change amount is smaller than the reference change amount M1. As shown in FIG. 6, in this embodiment, although the value of the reference change amount M1 is set to a value between the value X and the value Y of the hot water supply temperature change amount, as shown in FIG. 5, during the period from the point of time t1 to the point of time t2, the hot water supply temperature is lower than a temperature L1 which is the predetermined temperature. Accordingly, the feedback control is not started.

As shown in FIG. 5, after the point of time t2, the influence of dwelling water in the hot water supply unit 11a or the like starts disappearing and hence, the hot water supply temperature is sharply elevated to exceed the predetermined temperature to some extent (point of time: t2 to point of time: t4). Within this time range, during the period from a point of time immediately before the hot water supply temperature reaches the predetermined temperature to a point of time that the hot water supply temperature exceeds the predetermined temperature, the temperature change of the hot-water supply temperature exhibits steep inclination and hence, the value of the hot water supply temperature change amount is larger than the reference change amount M1.

Then, after the point of time t3, the hot water supply temperature is above the predetermined temperature (see FIG. 5), and is changed at steep inclination. Thereafter, the inclination of the change of hot water supply temperature becomes gentle after the point of time t4. After the point of time t4, the value of the hot water supply temperature change amount transcends such that the value is gradually decreased and becomes smaller than the reference change amount M1 soon (see FIG. 6).

In this example, as shown in FIG. 5 and FIG. 6, a point of time t5 which comes after the point of time t4 corresponds to a point of time where the hot water supply temperature becomes stable (the hot water supply temperature change amount becoming smaller than the reference change amount M1) and the hot water supply temperature becomes not lower than the temperature L1 which is the predetermined temperature. Accordingly, in this example, the controller 50 starts a feedback control from the point of time t5.

In this manner, the hot water supply temperature and the hot water supply temperature change amount are used as parameters, and when predetermined conditions are satisfied with these parameters, the feedback control is started. As described above, the feedback control is readily started with respect to the discharge water temperature at a point of time that the hot water supply temperature becomes not lower than the predetermined temperature and becomes stable and hence, it is possible to acquire mixed water of predetermined temperature within a shorter time in a stable manner.

For example, to consider a case where water of relatively low temperature remains within the hot water supply pipe 11 during winter season or the like, when water discharge starts, such water of low temperature flows out by way of the mixing valve unit 30, and is subject to temperature detection by the mixed water thermistor 22. When the feedback control is performed in such a case, the mixing valve unit 30 is controlled so as to elevate the discharge water temperature to a maximum (to open the hot water inflow port 33a side at maximum). However, hot water of relatively high temperature supplied from the hot water supply unit 11a flows into the hot water supply pipe 11 and hence, immediately after water of low temperature flows out, the hot water of high temperature is supplied to the mixing valve unit 30. That is, there arises a state where hot water of high temperature is supplied to the mixing valve unit 30 in a state that the hot water supply port 33a side is opened at maximum. Accordingly, there may be a case where mixed water of temperature largely above the predetermined temperature is discharged from a discharge opening 5a of the faucet body 5. Accordingly, in this embodiment, by starting the feedback control at a point of time that the hot water supply temperature becomes not lower than the predetermined temperature and becomes stable, it is possible to prevent a phenomenon that mixed water of temperature is largely above the predetermined temperature is discharged.

Further, for example, assume a case where when the mixed water is discharged again after a lapse of not so long time from stopping the discharge of mixed water, the hot water supply temperature is set to a predetermined temperature lower than a predetermined temperature at the time of previous-time discharge of mixed water due to an operation of the hot water supply unit 11a. Since the hot water temperature is already at a fixed temperature also with respect to dwelling water in the hot water supply unit 11a, for example, the time from the point of time t0 to the point of time t2 in FIG. 5 and FIG. 6 becomes extremely short. Accordingly, as shown in FIG. 4, it is considered that the hot water supply temperature exceeds the temperature L0 which is the predetermined temperature and becomes stable within an extremely short time from starting the supply of hot water. Further, when the hot water supply temperature becomes stable, the hot water supply temperature change amount becomes not more than the reference change amount M1 as described above, and the feedback control is started from this point of time. Further, the newly set predetermined temperature is lower than the predetermined temperature at the previous point of time of stopping the discharge of water and hence, the time from the point of time t2 to the point of time t5 in FIG. 5 and FIG. 6 is also shortened so that start timing of the feedback control becomes earlier.

In other words, when the predetermined temperature is set to a temperature lower than the previous-time predetermined temperature and a hot-water re-supply operation is performed, the temperature which is detected with respect to a temperature of hot water supplied from the hot water supply unit 11a becomes rapidly stable at a temperature not lower than the predetermined temperature and hence, the feedback control is started readily. Accordingly, different from the related art, it is unnecessary to wait for a lapse of fixed time necessary for discharging hot water dwelling in the hot water supply pipe or to wait for approaching of the hot water supply temperature to final data the hot water supply temperature at the time of previous discharging of hot water thus shortening a control time from a point of time of hot-water re-supply operation.

In the above-mentioned explanation, the explanation is made with respect to start timing of the feedback control when the predetermined temperature is set to a temperature "lower than" the previous-time predetermined temperature, and the hot-water re-supply operation is performed after a lapse of not so long time from stopping the discharge of mixed water. To the contrary, to assume a case where a long time elapses before the mixed water is discharged again, although the time from the point of time t0 to the point of time t2 in FIG. 5 and FIG. 6 is not largely shortened, the time from the point of time t2 to the point of time t5 is shortened. Accordingly, start timing of the feedback control becomes earlier than a related art by such an amount.

Further, assume a case where the hot-water re-supply operation is performed with the predetermined temperature set "higher than" the previous-time predetermined temperature. To compare this embodiment with a case which adopts the related art "a water-and-hot-water mixing ratio of a water-and-hot-water mixing device is maintained in a previous stopped state until a preliminarily set fixed time elapses irrelevant to monitoring of the newest updated data and, thereafter, the feedback control is performed using a mixed water temperature detector such as a thermistor", there may be a case where there is not significant difference between this embodiment and the related art depending on setting of the fixed time which is a standby time for starting the feedback control. However, in the related art, it is necessary to set the standby time for each kind of hot water supply unit corresponding to a pipe length of a hot water supply pipe which differs for respective kinds of hot water supply units. On the other hand, the standby time may be set corresponding to the hot water supply unit having the longest pipe. In this case, however, the feedback control start timing is delayed with respect to the hot water supply unit having the relatively short pipe length wastefully. Accordingly, the control of this embodiment which can use the control program in common irrespective of the kinds of hot water supply unit is superior to the related art.

In this manner, according to the water-and-hot-water mixing device 1 of this embodiment, the feedback control with respect to the discharge water temperature is started at optimum timing and hence, at the time of starting the discharge of mixed water again, it is possible to obtain stable mixed water with time as short as possible. That is, according to the water-and-hot-water mixing device 1, at the time of starting water discharge, provided that the actual hot-water supply temperature is not lower than the current predetermined temperature and is stable, the feedback control of the discharge water temperature can be performed without waiting for a preliminary determined fixed time or without waiting for approaching of the predetermined temperature to the previous-time hot water supply temperature. Accordingly, it is possible to obtain mixed water of stable predetermined temperature within a short time.

Further, in the water-and-hot-water mixing device 1 of this embodiment which performs the feedback control with respect to the hot water supply temperature under the predetermined conditions as described above, the mixing valve unit 30 is configured to include the thermo-valve 31 which incorporates the temperature sensing spring 35 and hence, the water-and-hot-water mixing device 1 can acquire the following advantageous effects. That is, even when hot water of high temperature is suddenly supplied to the hot water supply pipe 11 in a state where the feedback control is not performed, due to the movement of the valve element 34 caused by a change of a biasing force of the temperature sensing spring 35, the temperature of mixed water is controlled to a value close to the predetermined temperature. Accordingly, possibility that overshoot occurs with respect to the temperature of the mixed water becomes extremely small.

To be more specific, when hot water of temperature higher than the temperature of hot water at the time of previous stopping of water discharge is supplied to the inside of the casing 33 from the hot water supply pipe 11 by way of the hot water supply port 33a, the temperature sensing spring 35 senses the temperature of mixed water, and changes a biasing force thereof corresponding to the sensed temperature thus increasing the biasing force against the valve element 34. Due to such an operation, the valve element 34 moves toward a side opposite to a flow-out side (a left side in FIG. 3) and restricts the inflow of hot water of temperature higher than the temperature of hot water at the time of previous stopping of mixed water into the inside of the casing 33 from the hot water supply port 33a. That is, the temperature sensing spring 35 changes the biasing force against the valve element 34 corresponding to the temperature change thus displacing the valve element 34 to the side opposite to the flow-out side whereby the sudden inflow of hot water of high temperature to the inside of the casing 33 can be restricted. Due to such operations, the mixing valve unit 30 controls the temperature of mixed water to a value close to the predetermined temperature so that possibility of overshooting becomes small. As described above, by providing the constitution which includes the temperature sensing spring 35 as the temperature sensing member to the mixing valve unit 30, it is possible to obtain mixed water of stable temperature close to the predetermined temperature as early as possible before a point of time that the feedback control is started.

As described above, according to the water-and-hot-water mixing device 1 of this embodiment, the adjustment time of discharge water temperature can be made as short as possible and, at the same time, it is possible to prevent an overshoot phenomenon where mixed water of high temperature is discharged from the mixing valve unit 30. The present invention is not limited to the above-mentioned embodiment, and various modifications and variations are conceivable within the gist of the present invention described in claims. Accordingly, the above-mentioned control of start timing of feedback control based on the hot water supply temperature is also applicable to the constitution which includes a so-called single lever faucet, for example. In such constitution, one operation lever (single lever) which is rotatably configured in the vertical direction as well as in the lateral direction is used as a temperature setting operation part, and due to mechanical operations caused by the displacement of the temperature setting operation part, a flow rate and temperature of mixed water are adjusted. That is, the flow rate of mixed water is adjusted by rotating the operation lever in the vertical direction, while the temperature of mixed water is adjusted by rotating the operation lever in the lateral direction.

Here, the water-and-hot-water mixing device 1 of this embodiment which includes the thermo-valve 31 electrically controlled by the motor 32 which constitutes a drive source and performs the feedback control with respect to the discharge water temperature has following drawbacks. That is, the thermo-valve 31 has temperature adjustment characteristic (temperature characteristic) which corresponds to temperature conditions, pressure conditions or the like of supplied hot water and water attributed to the structure of the temperature sensing spring 35 which constitutes the temperature sensing part or the like. Further, the responsiveness of the thermo-valve 31 which is subject to a feedback control with respect to the discharge water temperature influences time necessary for making the discharge water temperature after correction stable.

Accordingly, in performing the feedback control with respect to the discharge water temperature, for example, when the following control is performed by sufficiently taking temperature adjustment characteristic and responsiveness of the thermo-valve 31 into consideration, there may be a case where the time until the completion of correction of the discharge water temperature becomes extremely long. That is, to eliminate a gap between the detected discharge water temperature and the predetermined temperature, the valve element 34 of the thermo-valve 31 is moved little in the direction that the discharge water temperature approaches the predetermined temperature, the discharge water temperature and the predetermined temperature are compared to each other again, and when a gap still exists between the discharge water temperature and the predetermined temperature, the valve element 34 is moved by the same distance (moving amount) again. That is, based on the comparison between the discharge water temperature and the predetermined temperature, the valve element 34 is moved little by little until the discharge water temperature and the predetermined temperature agree with each other.

On the other hand, in the feedback control with respect to the discharge water temperature, when the control is performed without taking temperature adjustment characteristic and responsiveness of the thermo-valve 31 into consideration, depending on temperature conditions, pressure conditions or the like of supplied hot water and water, there may be a case where hunching of discharge water temperature (a phenomenon where the discharge water temperature is not stable and jumps up and down) occurs. Such elongation of time necessary for correcting discharge water temperature or the occurrence of hunching gives a discomfort to a user of a washbowl or the like.

Accordingly, in the water-and-hot-water mixing device 1 of this embodiment which includes the thermo-valve 31, in the feedback control with respect to the discharge water temperature, a control explained hereinafter (hereinafter referred to as "discharge water temperature control") is performed. The discharge water temperature control, in the adjustment of the discharge water temperature in the water-and-hot-water mixing device 1, aims at the enhancement of responsiveness of the temperature control as well as the reduction of hunching by performing a feed-forward control of driving of the motor 32 in conformity with the temperature adjustment characteristic of the thermo-valve 31 and, thereafter, by performing the feedback control with the predetermined restriction based on the difference between the predetermined temperature and the detection temperature (hereinafter referred to as "temperature deviation").

The discharge water temperature control is performed such that the controller 50 controls the mixing valve unit 30 (motor 32 of the mixing valve unit 30) based on an operation signal from the operation part 6 and a detection signal from the mixed water thermistor 22. Hereinafter, the discharge water temperature control is explained together with the constitution which the water-and-hot-water mixing device 1 includes.

Figure 7:
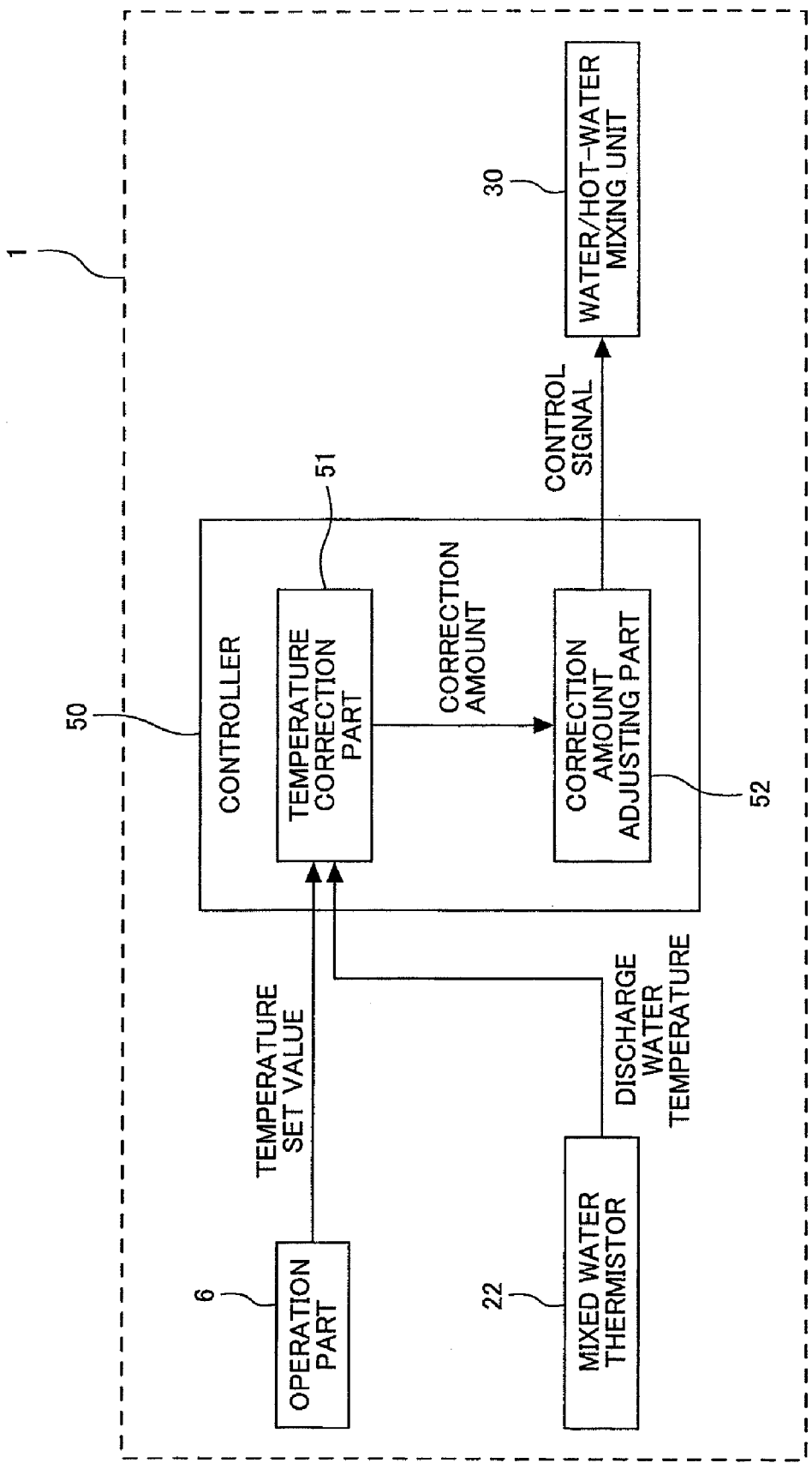
FIG. 7 is a block diagram showing one example of the constitution of a control part of the water-and-hot-water mixing device according to the first embodiment of the present invention.

First of all, the constitution of a control part in the water-and-hot-water mixing device 1 is explained in conjunction with FIG. 7. As shown in FIG. 7, the controller 50 includes a temperature correction part 51 for carrying out the discharge water temperature control. The temperature correction part 51, based on an operation signal from the operation part 6 corresponding to the predetermined temperature and a detection signal from the mixed water thermistor 22, calculates a correction amount in response to a valve control signal corresponding to the predetermined temperature corresponding to a magnitude of the temperature deviation such that the difference between the predetermined temperature and the detection temperature (temperature deviation) is decreased.

Accordingly, as shown in FIG. 7, a temperature set value (a value of predetermined temperature) is inputted to the temperature correction part 51 which the controller 50 includes as the operation signal from the operation part 6. Further, a signal corresponding to the detection temperature is inputted to the temperature correction part 51 as the detection signal from the mixed water thermistor 22.

Figure 8:
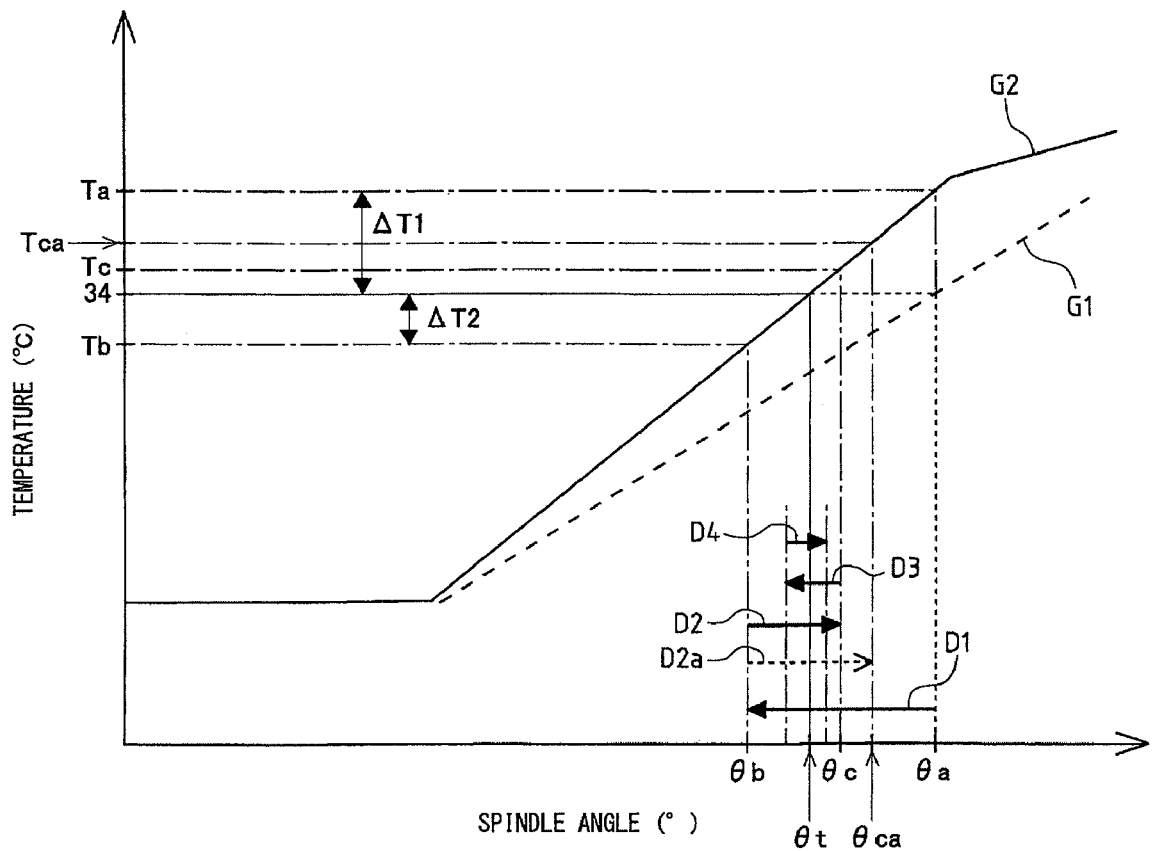
FIG. 8 is an explanatory view showing the relationship between a spindle angle and temperature.

The calculation of the correction amount corresponding to the valve control signal by the temperature correction part 51 is specifically performed as follows. That is, in the controller 50, the relationship between the predetermined temperature and the spindle angle is preliminarily set and stored in the temperature correction part 51 or the like. As shown in FIG. 8, in this embodiment, as the relationship between the predetermined temperature and the spindle angle, the relationship expressed by a linear graph (see symbol G1) is used. That is, the graph indicated by symbol G1 in FIG. 8 is a temperature curve which is preliminarily set and stored in the controller 50 (hereinafter referred to as "predetermined temperature curve G1"). The predetermined temperature curve G1 is prepared by taking the temperature adjustment characteristic of the thermo-valve 31 which corresponds to temperature conditions, pressure conditions or the like of the supplied hot water and water into consideration. In the graph shown in FIG. 8, the spindle angle (°) is taken on an axis of abscissas, and temperature (° C.) is taken on an axis of ordinates.

As shown in FIG. 8, in the discharge water temperature control, for example, when 34° C. is set as the predetermined temperature, the temperature correction part 51, first of all, calculates θa as a calculation result of the spindle angle corresponding to 34° C. based on the predetermined temperature curve G1. However, the spindle angle and the actual discharge water temperature are changed depending on a pressure ratio, a temperature ratio or the like between hot water and water on a site where the washbowl cabinet 2 (see FIG. 1) is installed and hence, the spindle angle and the actual discharge water temperature do not always agree with the predetermined temperature curve G1.

Here, as shown in FIG. 8, the relationship between the discharge water temperature and the spindle angle corresponding to the pressure ratio between hot water and water on a site is expressed by a polygonal-line graph (see symbol G2), for example. That is, the graph indicated by symbol G2 in FIG. 8 is a temperature curve corresponding to the pressure ration or the like between the hot water and water on the site where the washbowl cabinet 2 is installed (hereinafter referred to as "on-site temperature curve G2").

According to the on-site temperature curve G2, when the spindle angle assumes an angle θa, the discharge water temperature becomes a temperature Ta higher than the predetermined temperature of 34° C. That is, the temperature Ta is detected by the mixed water thermistor 22. In this case, the temperature correction part 51, based on an operation signal from the operation part 6 corresponding to the predetermined temperature of 34° C. and a detection signal corresponding to the temperature Ta from the mixed water thermistor 22, calculates a correction amount in response to a valve control signal corresponding to 34° C. such that the temperature deviation ΔT1 is decreased.

Here, the calculation of the correction amount by the temperature correction part 51 is performed corresponding to a magnitude of the temperature deviation. To be more specific, the correction amount is calculated by the temperature correction part 51 in accordance with the inclination (ΔT/Δθ) of the predetermined temperature curve G1 based on the predetermined temperature curve G1. Accordingly, in this case, the temperature correction part 51 calculates the correction amount in response to the valve control signal based on the predetermined temperature curve G1 such that the discharge water temperature is lowered (the valve element 34 (see FIG. 3) is moved to a side opposite to a flow-out side) corresponding to the temperature deviation ΔT1. According to such a correction amount, the spindle angle is changed from the angle θa to an angle θb (see an arrow D1). That is, a value of ΔT1/(θa-θb) corresponds to the inclination (ΔT/Δθ) of the predetermined temperature curve G1. The correction amount in response to the valve control signal calculated by the temperature correction part 51 in this manner is simply referred to as "correction amount" hereinafter.

Then, in the discharge water temperature control, the correction amount calculated by the temperature correction part 51 is gradually decreased for every calculation of the correction amount. That is, the correction amount is adjusted by the temperature correction part 51 such that each time the correction amount is calculated by the temperature correction part 51, a rate of the temperature correction is gradually decreased. Accordingly, the controller 50 includes a correction amount adjusting part 52. The correction amount adjusting part 52 adjusts the correction amount by multiplying the correction amount with a predetermined coefficient corresponding to the number of times of calculation of correction amount for every calculation of the correction amount by the temperature correction part 51.

Accordingly, as shown in FIG. 7, in the controller 50, a calculation result of the correction amount by the temperature correction part 51 is supplied to the correction amount adjusting part 52. Accordingly, the correction amount adjusting part 52 adjusts the correction amount based on the calculation result obtained by the temperature correction part 51. To be more specific, the correction amount adjusting part 52, by multiplying the correction amount with a predetermined coefficient (hereinafter referred to as "first adjustment coefficient"), decreases the correction amount each time the correction amount is calculated by the temperature correction part 51. That is, the correction amount adjusting part 52 multiplies the correction amount by a numerical value of not more than 1 which gradually decreases including the same value as the first adjustment coefficient for every calculation of the correction amount by the temperature correction part 51.

Then, as shown in FIG. 7, the correction amount after the adjustment by the correction amount adjusting part 52 (the correction amount which is multiplied by the first adjustment coefficient) is outputted to the mixing valve unit 30 as a valve control signal. That is, the controller 50 adjusts the correction amount calculated by the temperature correction part 51 by multiplying the correction amount with the first adjustment coefficient by the correction amount adjusting part 52, and controls the mixing valve unit 30 based on the correction amount after the adjustment. In this manner, the correction amount after the adjustment calculated by the correction amount adjusting part 52 which the controller 50 includes is reflected on the discharge water temperature controlled by the controller 50.

With respect to the first adjustment coefficient, for example, when the correction (the control of the mixing valve unit 30 based on the correction amount calculated by the temperature correction part 51) is performed four times, as numerical values which are decreased for every calculation of the correction amount by the temperature correction part 51, numerical values of 1 (100%), 0.7 (70%), 0.5 (50%), 0.3 (30%) are used. That is, here, in the first correction, the value of 100% of the correction amount calculated by the temperature correction part 51 is used as an actual correction amount (outputted as a valve control signal). Then, in the second correction, the value of 70% of the correction amount calculated by the temperature correction part 51 is used as an actual correction amount. In the same manner, in the third correction, the value of 50% of the correction amount calculated by the temperature correction part 51 is used as an actual correction amount, and in the fourth correction, the value of 30% of the correction amount calculated by the temperature correction part 51 is used as an actual correction amount. Here, the discharge water temperature control is performed at preliminarily-set predetermined time intervals (five seconds), for example.

The case where 1 (100%), 0.7 (70%), 0.5 (50%), 0.3 (30%) are used as the first adjustment coefficient in this manner is further explained in conjunction with FIG. 8. Here, the case where 34° C. is set as the predetermined temperature as described previously is explained. In this case, the temperature correction part 51, as shown in FIG. 8, calculates the temperature Ta of the discharged water by setting the spindle angle to θa based on the predetermined temperature curve G1 (see on-site temperature curve G2) and the correction amount corresponding to the temperature deviation ΔT1 between the predetermined temperature and 34° C. Such correction amount is the correction amount calculated by the first correction and hence, "1" is multiplied as the first adjustment coefficient in the correction amount adjustment part 52. That is, in this case, in the first correction, the correction amount calculated by the temperature correction part 51 is directly outputted to the mixing valve unit 30 as it is.

According to the correction amount corresponding to the temperature deviation ΔT1, as described previously, the spindle angle is changed from the angle θa to the angle θb in accordance with the inclination of the predetermined temperature curve G1 (see an arrow D1). When the spindle angle is the angle θb, according to the on-site temperature curve G2, the discharge water temperature (detection temperature) becomes temperature Tb lower than the predetermined temperature of 34° C. Such a case where the spindle angle which is changed corresponding to the correction amount calculated in accordance with the inclination (ΔT/Δθ) of the predetermined temperature curve G1 exceeds an angle θt which is the spindle angle corresponding to the predetermined temperature of 34° C. (spindle angle which becomes a target) occurs when the inclination of the on-site temperature curve G2 is larger than the inclination of the predetermined temperature curve G1.

Accordingly, the temperature correction part 51, as the second correction, calculates the correction amount corresponding to the temperature deviation ΔT2 between the predetermined temperature of 34° C. and the temperature of discharged water. Such correction amount is the correction amount calculated by the second correction and hence, "0.7" is multiplied as the first adjustment coefficient in the correction amount adjustment part 52. With the correction amount which is multiplied by 0.7 as the first adjustment coefficient, the spindle angle is changed from the angle θa to the angle θc (see an arrow D2). Here, the correction amount in the second correction is calculated, in the same manner as the case of the first correction, in accordance with the inclination of the predetermined temperature curve G1 such that the discharge water temperature is elevated corresponding to the temperature deviation ΔT2 (such that the valve element 34 (see FIG. 3) moves toward a flow-out side).

When the spindle angle assumes an angle θc, the discharge water temperature assumes the temperature Tc higher than the predetermined temperature of 34° C. according to the on-site temperature curve G2. Here, assume a case where the adjustment of correction amount (multiplication of the first adjustment coefficient 0.7) by the correction amount adjustment part 52 is not performed, that is, a case where the correction amount calculated by the temperature correction part 51 is directly used as it is, as shown in FIG. 8, the spindle angle is changed from the angle θb to the angle θca (corresponding to temperature Tca), for example (see a broken arrow D2a).

The angle θca which is the spindle angle when the adjustment of the correction amount is not performed by the correction amount adjustment part 52 in the second correction, compared with the angle θc which is the spindle angle when the adjustment of the correction amount is performed, exhibits the large difference between the angle θca and an angle θt which is the spindle angle corresponding to the predetermined temperature of 34° C. In other words, the temperature Tca when the adjustment of the correction amount is not performed by the correction amount adjustment part 52 in the second correction, compared with the temperature Tca when the adjustment of the correction amount is performed, exhibits the large difference between the temperature Tca and the predetermined temperature of 34° C. That is, although the spindle angle is changed from the angle θb to the angle θc when the adjustment of correction amount is not performed in the second correction, due to the adjustment of correction amount performed by the correction amount adjustment part 52, the change of the spindle angle from the angle θb is suppressed to the change to the angle θc close to the angle θt which is the target.

Then, the correction amount adjustment part 52 multiplies the correction amount calculated by the third correction (correction amount corresponding to the temperature deviation between the temperature Tc and the predetermined temperature of 34° C.) with 0.5 as the first adjustment coefficient. With the correction amount multiplied by 0.5 as the first adjustment coefficient, the spindle angle is changed to a side where the discharge water temperature is low compared to the angle θt which is the target and, at the same time, is changed to an angle closer to the angle θt which is the target than the angle θc by the second correction (see an arrow D3). In the same manner, the correction amount adjustment part 52 multiplies the correction amount calculated by the fourth correction with 0.3 as the first adjustment coefficient. With the correction amount multiplied by 0.3 as the first adjustment coefficient, the spindle angle is changed to a side where the discharge water temperature is high compared to the angle θt which is the target and, at the same time, is changed to an angle closer to the angle θt which is the target than the spindle angle by the third correction (see an arrow D4).

In this manner, by multiplying the correction amount with the first adjustment coefficient which is gradually lowered each time the correction is made by the correction amount adjustment part 52, the spindle angle is converged to the target spindle angle (angle angle θt) corresponding to the predetermined temperature of 34° C. Here, the first adjustment coefficient used in the adjustment of the correction amount by the correction amount adjustment part 52 is preliminarily set and stored in the correction amount adjustment part 52 or the like by the controller 50 as a numerical value corresponding to the number of times of correction. Further, the number of times of the correction is also preliminarily set as the predetermined number of times. That is, when the correction is performed 5 times or more in the above-mentioned example, as the first adjustment coefficient used in the fifth correction or further-number correction, a numerical value of 0.3 or less is suitably used.

Figure 9A:
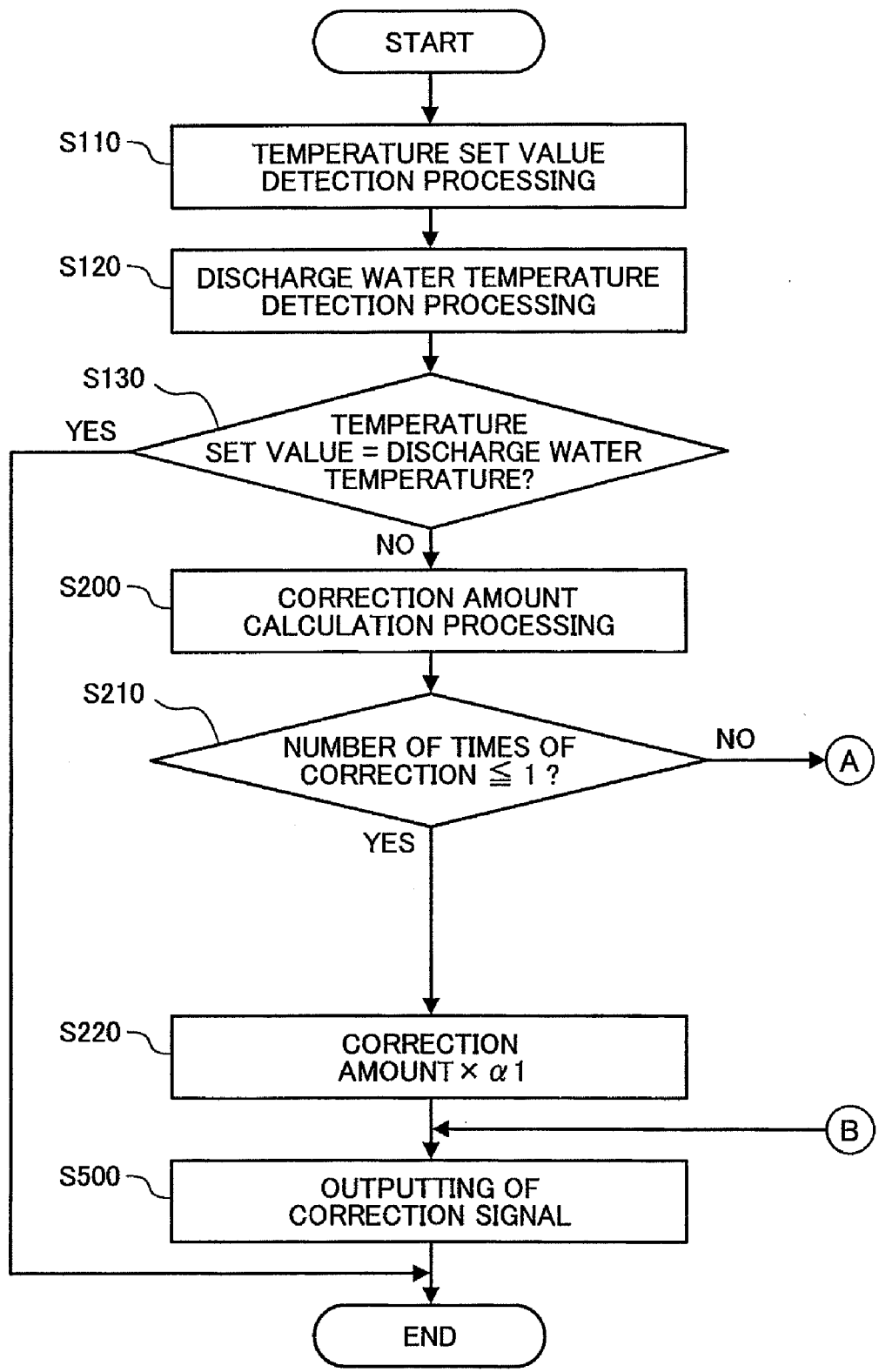
FIG. 9A and FIG. 9B are flowcharts showing one example of a mixed water temperature control by the water-and-hot-water mixing device according to the first embodiment of the present invention.
Figure 9B:
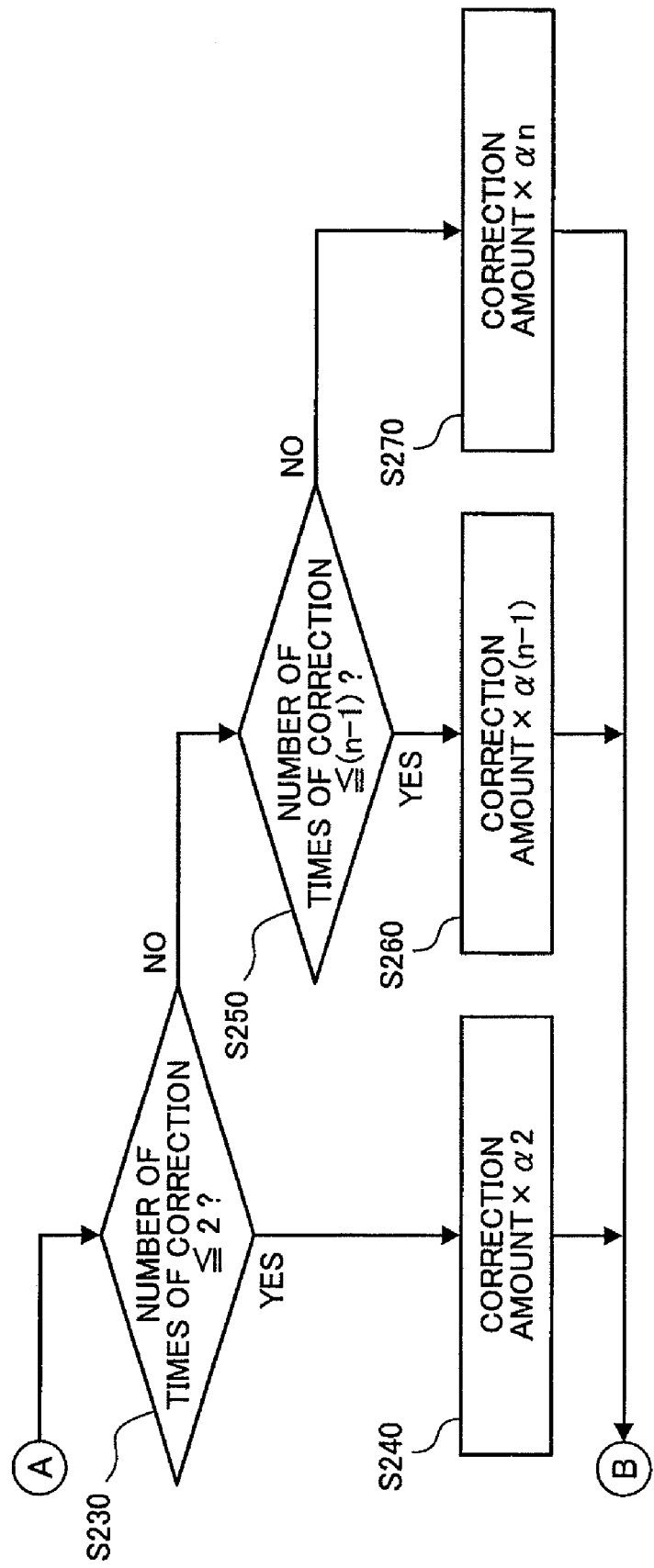

The above-mentioned discharge water temperature control is explained using a flowchart shown in FIG. 9A and FIG. 9B. In the explanation made hereinafter, assume that the correction is made n times (n=1, 2, 3, . . . ), and the first adjustment coefficient used in the correction of each time as an (n=1, 2, 3, . . . ). Further, the flowchart shown in FIG. 9A and FIG. 9B describes the correction at an arbitrary time.

As shown in FIG. 9A, in the discharge water temperature control, first of all, the detection processing of the temperature set value is performed (step (hereinafter abbreviated to "S") 110). That is, the controller 50 detects the predetermined temperature based on an operation signal inputted from the operation part 6 in the temperature correction part 51. Next, the detection processing of discharge water temperature is performed (S120). That is, the controller 50 recognizes the detection temperature based on the detection signal imputed from the mixed water thermistor 22 in the temperature correction part 51.

Subsequently, it is determined whether or not the temperature set value and the discharge water temperature are equal (S130). That is, the controller 50 determines whether or not the detection temperature and the predetermined temperature are equal in the temperature correction part 51. Here, when the controller 50 determines that the detection temperature and the predetermined temperature are equal, the processing based on the discharge water temperature control is finished. That is, in this case, the position of the valve element 34 of the mixing valve unit 30 is a position corresponding to the target temperature and hence, the position of the valve element 34 is maintained (the correction amount being 0).

On the other hand, when the controller 50 does not determine that the detection temperature and the predetermined temperature are equal in the above-mentioned step S130, the calculation processing of the correction amount in response to a valve control signal is performed (S200). That is, the controller 50 calculates the correction amount in the temperature correction part 51. Then, the adjustment of correction amount by the correction amount adjusting part 52 is applied to the correction amount calculated in the above-mentioned step S200.

That is, when the number of times of correction is the first time, the correction amount calculated in the above-mentioned step S200 is multiplied by α1 as the first adjustment coefficient (S210, S220). Then, a correction amount multiplied by α1 as the first adjustment coefficient is outputted to the mixing valve unit 30 as a valve control signal (S500).

In the same manner, when the number of times of correction is the second time, the correction amount calculated in the above-mentioned step S200 is multiplied by α2 as the first adjustment coefficient (S230, S240), and the correction amount multiplied by α2 is outputted to the mixing valve unit 30 as a valve control signal (S500). In such a case, the adjustment for every correction of each time with respect to the correction amount outputted to the mixing valve unit 30 as a valve control signal is performed corresponding to the predetermined number of times of correction (n times) (S250, S260, S270).

The water-and-hot-water mixing device 1 of this embodiment having the above-mentioned constitution includes the thermo-valve 31 which is electrically controlled by a motor 32 and performs a feedback control on the discharge water temperature (discharge water temperature control) and hence, the time necessary for correcting the discharge water temperature can be shortened thus suppressing the occurrence of hutching of the discharge water temperature.

That is, in the above-mentioned discharge water temperature control, assume a case where a value of 100% is used based on a predetermined temperature curve GI which is preliminarily set with respect to the correction amount (a case where the adjustment of the correction amount is not performed), hunching may occur in the discharge water temperature depending on temperature conditions, pressure conditions or the like of hot water and water supplied to the mixing valve unit. Such hunching occurs attributed to the separation of temperature inclination between a temperature curve on a site where the washbowl cabinet 2 is installed (see a on-site temperature curve G2 in FIG. 8) and a reference temperature curve (see a predetermined temperature curve G1 in the same drawing) in the water-and-hot-water mixing device 1. This bunching in the discharge water temperature may cause the prolongation of time until the discharge water temperature becomes stable.

By adjusting the correction amount as in the case of the discharge-water temperature control of this embodiment, that is, by decreasing a rate of correction (a rate of correction amount calculated by the temperature correcting part 51) along with the increase of the number of times of correction, irrespective of temperature conditions, pressure conditions or the like on a site where the washbowl cabinet 2 is installed, the responsiveness of a temperature control (shortening of time until the discharge water temperature becomes stable) can be enhanced and, at the same time, the hunching of the discharge water temperature can be suppressed. Accordingly, it is possible to realize a temperature control which does not give a discomfort to a user of the washbowl cabinet 2.

Here, a value of the first adjustment coefficient used in the adjustment of the correction amount is not particularly limited, and may be suitably set corresponding to temperature conditions, pressure conditions or the like on a site where the washbowl cabinet 2 is installed. Further, with respect to a value of the first adjustment coefficient, the same value may be used plural times continuously or discontinuously in the correction of different times.

Hereinafter, a preferred mode for carrying out the discharge water temperature control is explained. In this discharge water temperature control, with respect to the adjustment of the correction amount by the correction amount adjusting part 52, it is desirable that the correction amount multiplied by the first adjustment coefficient is multiplied by a predetermined coefficient corresponding to the value of the predetermined temperature. That is, in this mode, the correction amount adjusting part 52 further multiplies the correction amount multiplied by the first adjustment coefficient by the predetermined coefficient corresponding to the value of the predetermined temperature (hereinafter referred to as "second adjustment coefficient")

Figure 10:
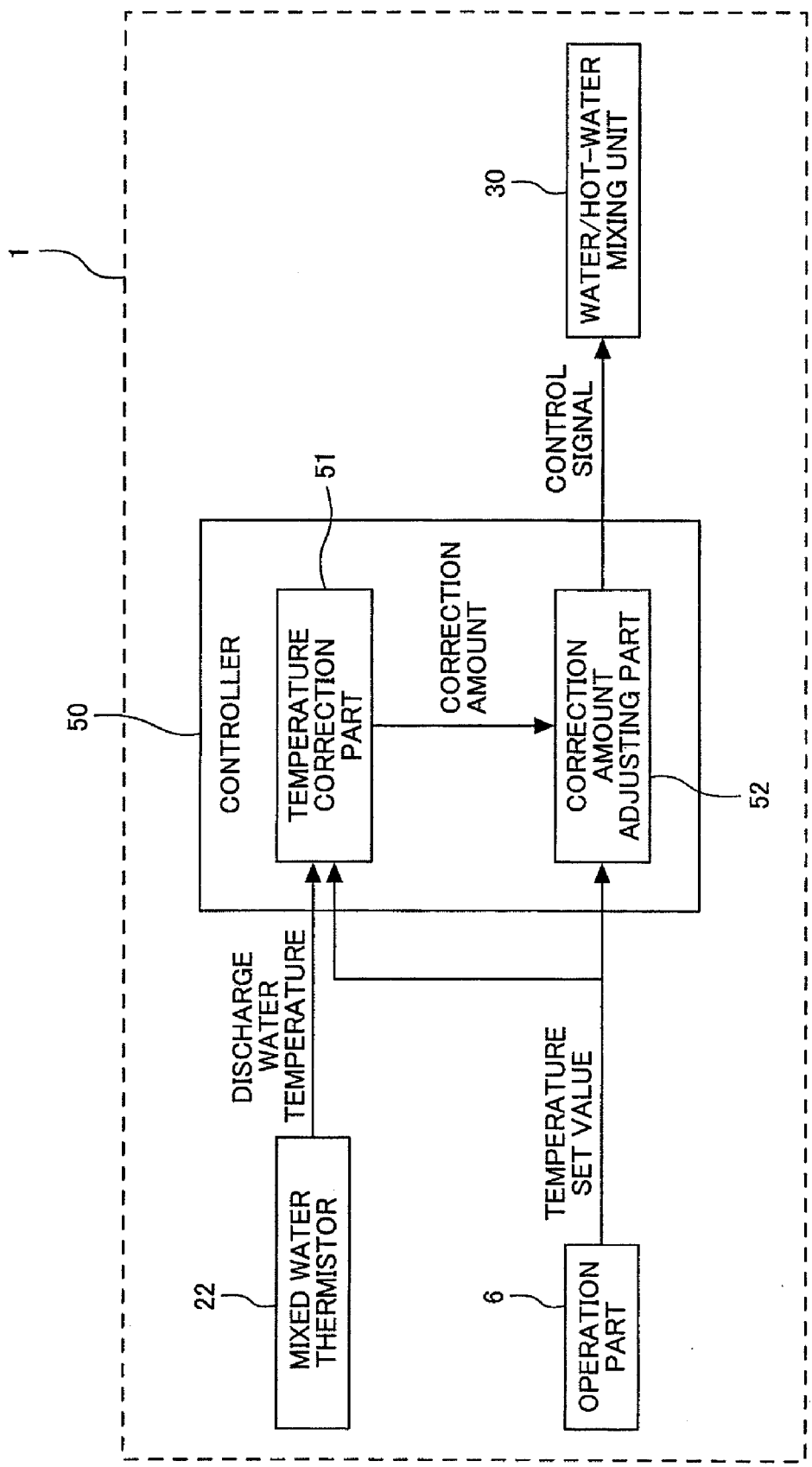
FIG. 10 is a block diagram showing another example of the constitution of the control part of the water-and-hot-water mixing device according to the first embodiment of the present invention.

As shown in FIG. 10, in this mode, to the correction amount adjusting part 52 which the controller 50 includes, in addition to a calculation result from the temperature correcting part 51 with respect to the correction amount, a temperature setting value (a value of predetermined temperature) is inputted as an operation signal from the operation part 6. Accordingly, in the adjustment of the correction amount, the correction amount adjusting part 52 multiplies the correction amount calculated by the temperature correcting part 51 by the second adjustment coefficient corresponding to the predetermined temperature set by the operation part 6 in addition to the first adjustment coefficient corresponding to the number of times of correction.

With respect to the second adjustment coefficient, for example, assume a case where the temperature which can be set by the operation part 6 can be set at four stages. As numerical values which are decreased along with the gradual increase of the predetermined temperature by the operation part 6, numerals consisting of 1 (100%), 0.7 (70%), 0.5 (50%), 0.3 (30%) are used. That is, here, when the predetermined temperature is the temperature of the first stage, the value of 100% of the correction amount which is multiplied by the first adjustment coefficient is used as an actual correction amount (outputted as a valve control signal). Then, when the predetermined temperature is the temperature of the second stage, the value of 70% of the correction amount which is multiplied by the first adjustment coefficient is used as an actual correction amount. In the same manner, when the predetermined temperature is the temperature of the third stage, the value of 50% of the correction amount which is multiplied by the first adjustment coefficient is used as an actual correction amount, and when the predetermined temperature is the temperature of the fourth stage, the value of 30% of the correction amount which is multiplied by the first adjustment coefficient is used as an actual correction amount.

Figure 11A:
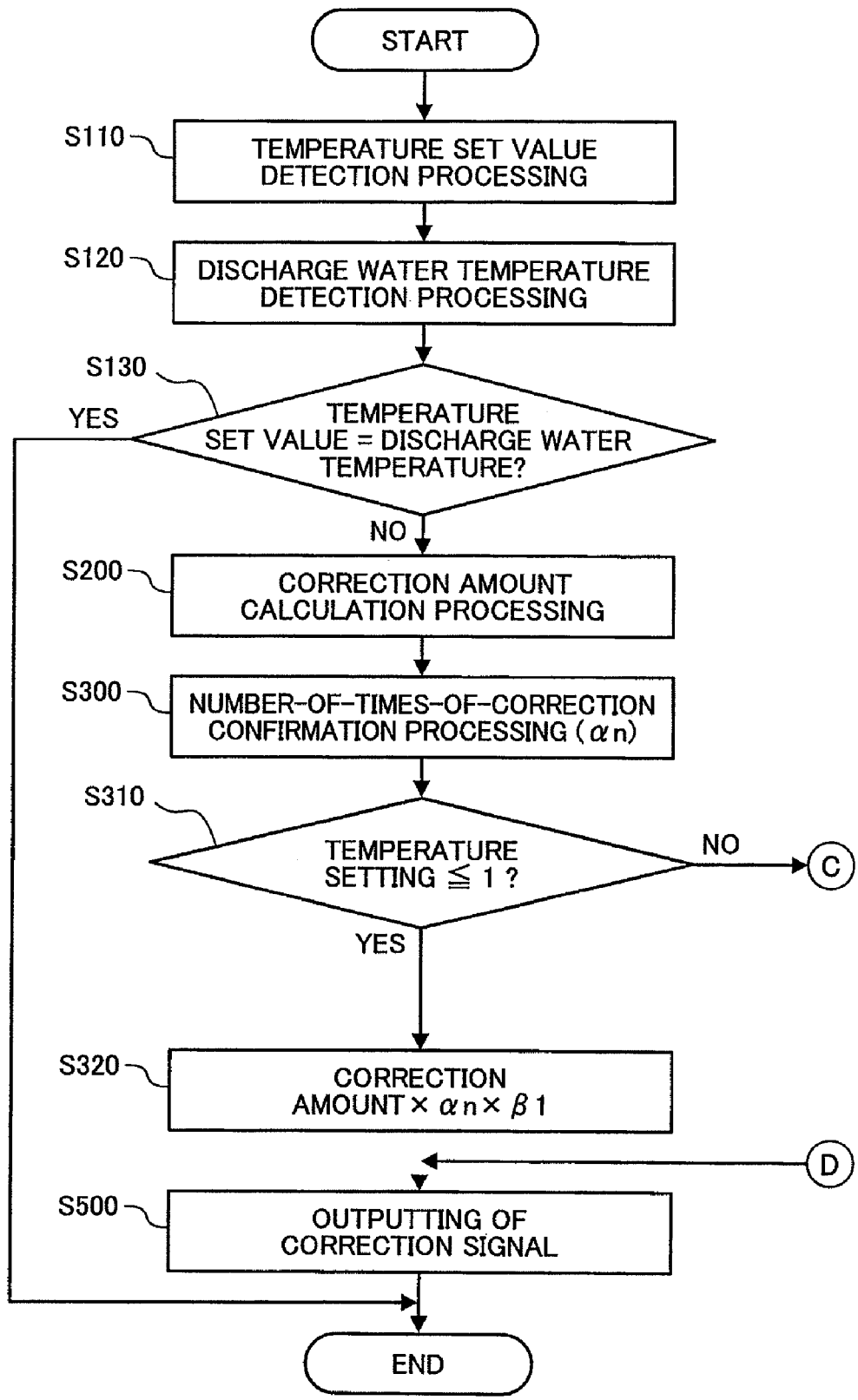
FIG. 11A and FIG. 11B are flowcharts showing another example of the mixed water temperature control by the water-and-hot-water mixing device according to the first embodiment of the present invention.
Figure 11B:
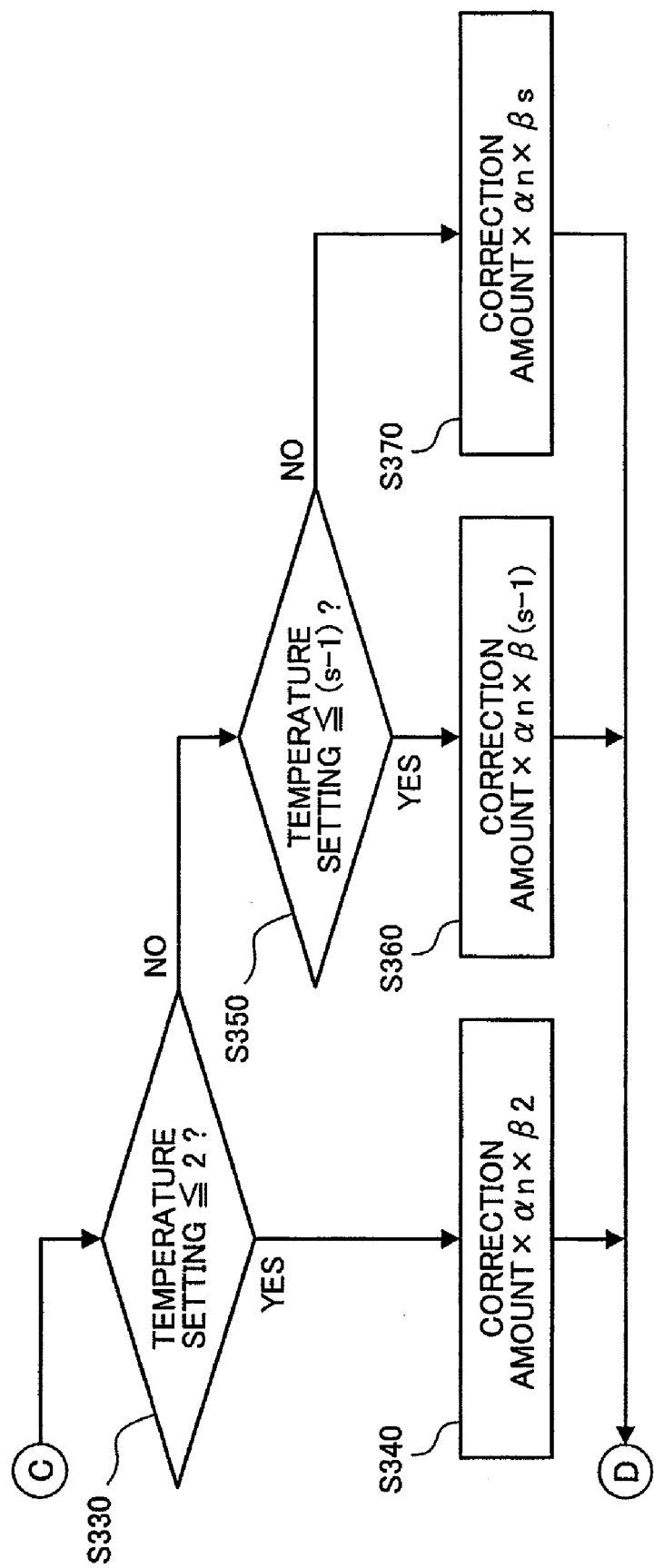

The discharge water temperature control of this mode is explained in conjunction with a flowchart shown in FIG. 11A and FIG. 11B. Here, portions of the discharge water temperature control which overlap with the contents explained in conjunction with the flowchart explained shown in FIG. 9A and FIG. 9B are omitted when the explanation is considered unnecessary while using the same symbols.

As shown in FIG. 11A and FIG. 11B, in the discharge water temperature control in this mode, after the calculation processing of the correction amount applied to the valve control signal (S200), the confirmation processing of the number of times of correction is performed (S300). Due to such processing, the first adjustment coefficient which is set corresponding to the number of times of correction is determined. Here, the explanation is made assuming a case where the number of times of correction is n times (when the first adjustment coefficient is $\alpha n$).

Then, in the adjustment of the correction amount, the multiplication with the second adjustment coefficient corresponding to the predetermined temperature is performed. That is, the correction amount which is multiplied by $\alpha n$ which is the first adjustment coefficient is multiplied by the second adjustment coefficient corresponding to the predetermined temperature set by the operation part 6. Here, the explanation is made assuming that the temperature setting in the operation part 6 is gradually performed in s stages (s=1, 2, 3, ... ). Further, the second adjustment coefficient used in temperature setting in the respective stages is set to $\beta s$ (s=1, 2, 3, ... ).

That is, when the stage of the temperature setting in the operation part 6 is "1" as shown in FIG. 11A, the correction amount calculated in the above-mentioned step S200 is multiplied by the first adjustment coefficient $\alpha n$ and the second adjustment coefficient $\beta 1$ (S310, S320). Then, a correction amount multiplied by second adjustment coefficient $\beta 1$ in addition to the first adjustment coefficient $\alpha n$ is outputted to the mixing valve unit 30 as a valve control signal (S500).

In the same manner, when the stage of temperature setting in the operation part 6 is "2", the correction amount calculated in the above-mentioned step S200 is multiplied by the first adjustment coefficient $\alpha n$ and the second adjustment coefficient $\beta 2$ (S330, S340), and a correction amount multiplied by $\alpha n$ and $\beta 2$ is outputted to the mixing valve unit 30 as a valve control signal (S500). The adjustment corresponding to each setting temperature stage with respect to the correction amount outputted to the mixing valve unit 30 as a valve control signal is performed corresponding to the preset number of stages (s stages) of the predetermined temperature (S350, S360, S370).

By adopting the discharge water temperature control of this mode, the adjustment of the correction amount is performed corresponding to the predetermined temperature set by the operation part 6. Due to such adjustment, in the discharge water temperature control, an optimum control can be performed in conformity with the predetermined temperature so that it is possible to readily bring the discharge water temperature to the predetermined temperature with respect to the respective predetermined temperatures. As a result, it is possible to make the occurrence of hunching of the discharge water temperature difficult thus giving a comfortable use feeling to a user of the washbowl cabinet 2.

Here, a value of the second adjustment coefficient in the adjustment of the correction amount is not limited to a value (a numerical value not more than 1) which maintains or decreases the correction amount multiplied by the first adjustment coefficient, the value of the second adjustment coefficient may be a value (a numerical value larger than 1) which increases the correction amount multiplied by the first adjustment coefficient. That is, the value of the second adjustment coefficient is not particularly limited and may be suitably set corresponding to temperature conditions, pressure conditions or the like on a site where the washbowl cabinet 2 is installed.

Next, another preferred mode for carrying out the discharge water temperature control is explained. In this discharge water temperature control, with respect to the adjustment of the correction amount by the correction amount adjusting part 52, it is desirable that the correction amount multiplied by the first adjustment coefficient is multiplied by a predetermined coefficient corresponding to the discharge water temperature. That is, in this mode, the correction amount adjusting part 52 further multiplies the correction amount multiplied by the first adjustment coefficient by the predetermined coefficient corresponding to a temperature (detected temperature) detected by the mixed water thermistor 22 (hereinafter referred to as "third adjustment coefficient").

Figure 12:
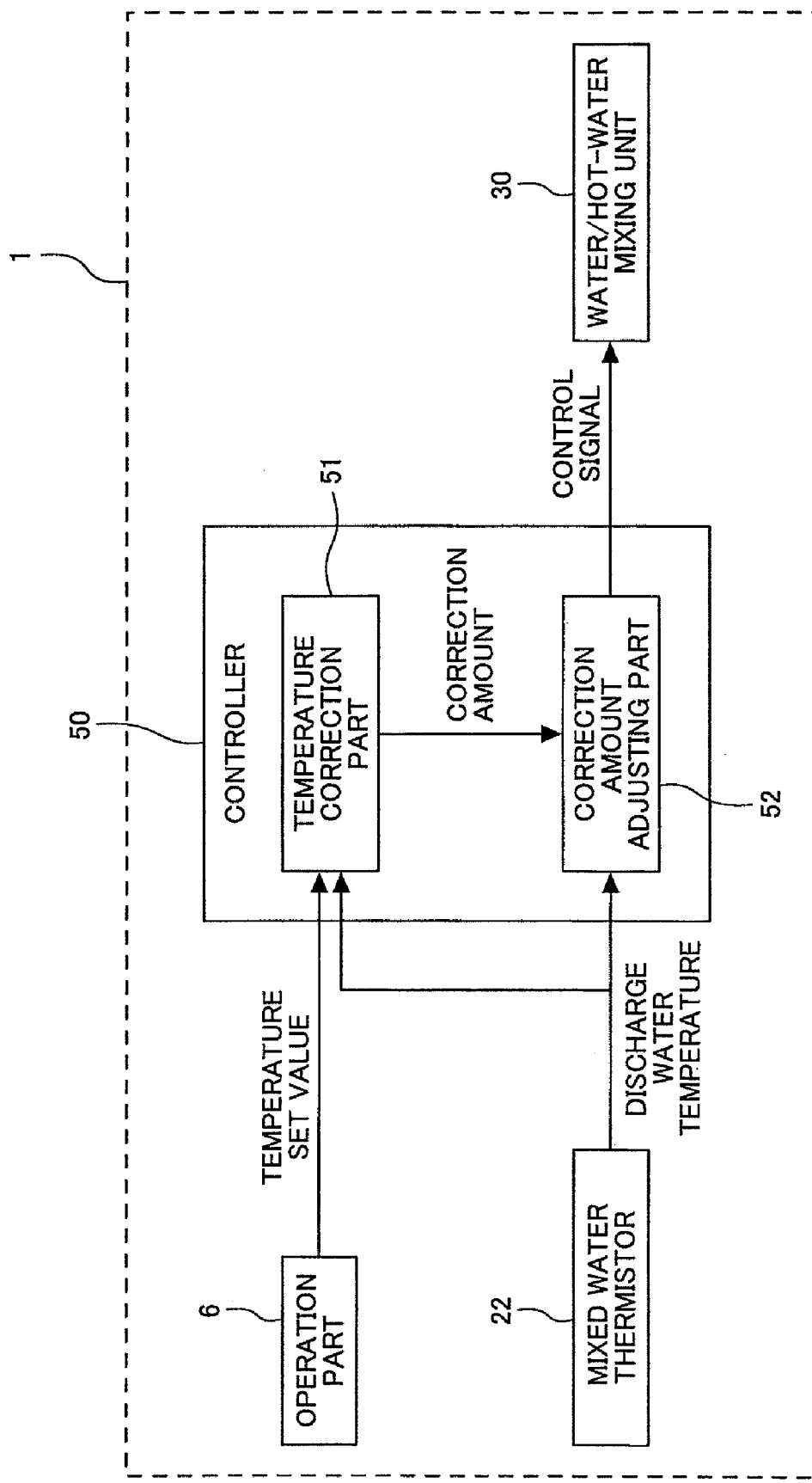
FIG. 12 is a block diagram showing still another example of the constitution of a control part of the water-and-hot-water mixing device according to the first embodiment of the present invention.

As shown in FIG. 12, in this mode, to the correction amount adjusting part 52 which the controller 50 includes, the discharge water temperature is inputted as a detection signal from the mixed water thermistor 22. Accordingly, in the adjustment of the correction amount, the correction amount adjusting part 52 multiplies the correction amount calculated by the temperature correcting part 51 by the third adjustment coefficient corresponding to the detection temperature detected by the mixed water thermistor 22 to in addition to the first adjustment coefficient corresponding to the number of times of correction.

With respect to the third adjustment coefficient, for example, when the detection temperature is recognized as four divided temperature ranges, as numerical values which is decreased along with the gradual increase of the detection temperature, numerals consisting of 1 (100%), 0.7 (70%), 0.5 (50%), 0.3 (30%) are used. That is, here, when the detection temperature falls within the first temperature range, the value of 100% of the correction amount which is multiplied by the first adjustment coefficient is used as an actual correction amount (outputted as a valve control signal). Then, when the detection temperature falls within the second temperature range, the value of 70% of the correction amount which is multiplied by the first adjustment coefficient is used as an actual correction amount. In the same manner, when the detection temperature falls within the third temperature range, the value of 50% of the correction amount which is multiplied by the first adjustment coefficient is used as an actual correction amount, and when the detection temperature falls within the fourth temperature range, the value of 30% of the correction amount which is multiplied by the first adjustment coefficient is used as an actual correction amount.

The discharge water temperature control of this mode is explained in conjunction with a flowchart shown in FIG. 13. Here, portions of the discharge water temperature control which overlap with the contents explained in conjunction with the flowchart shown in FIG. 9A and FIG. 9B are omitted when the explanation is considered unnecessary while using the same symbols.

Figure 13A:
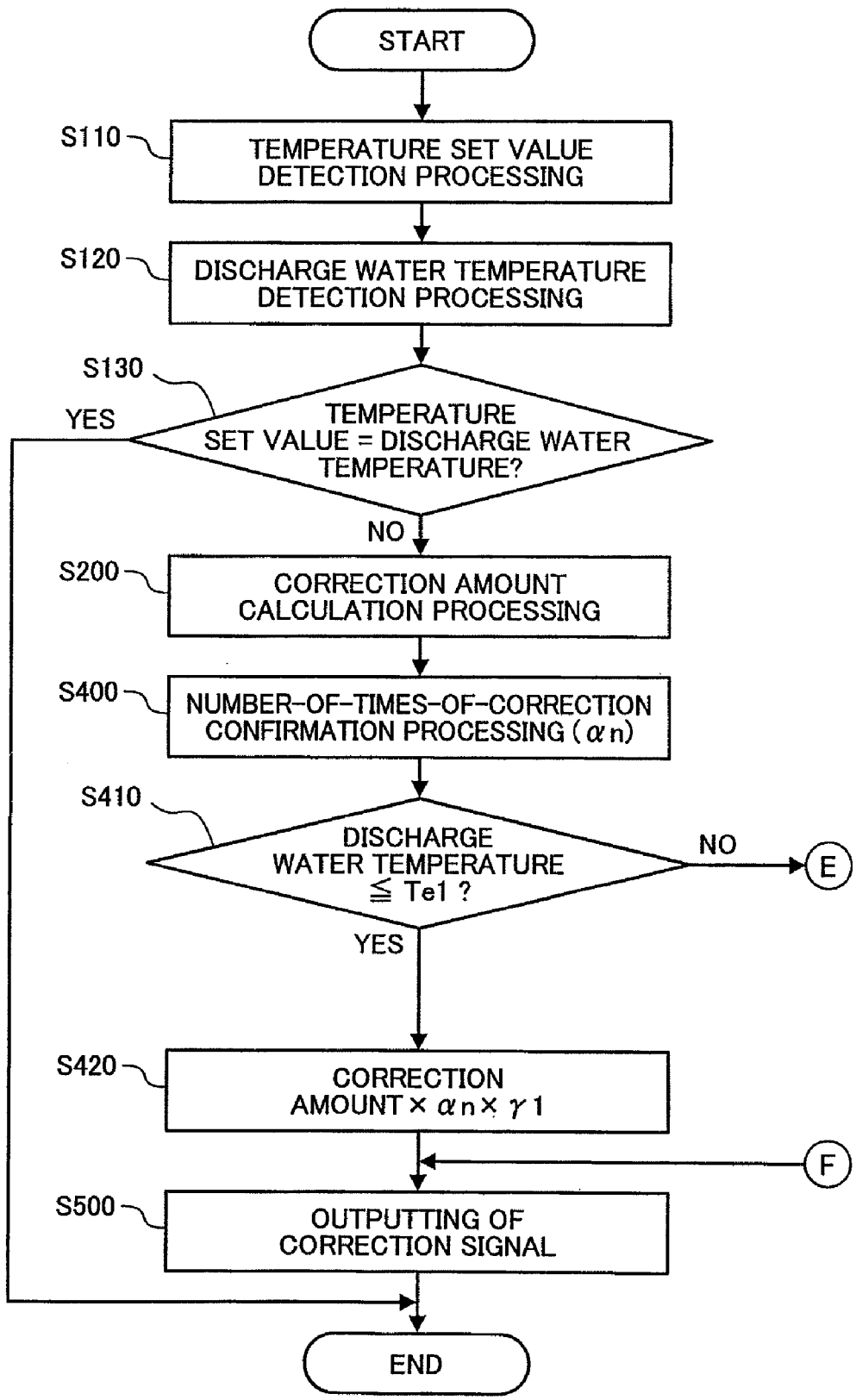
FIG. 13A and FIG. 13B are flowcharts showing still another example of a mixed water temperature control by the water-and-hot-water mixing device according to the first embodiment of the present invention.
Figure 13B:
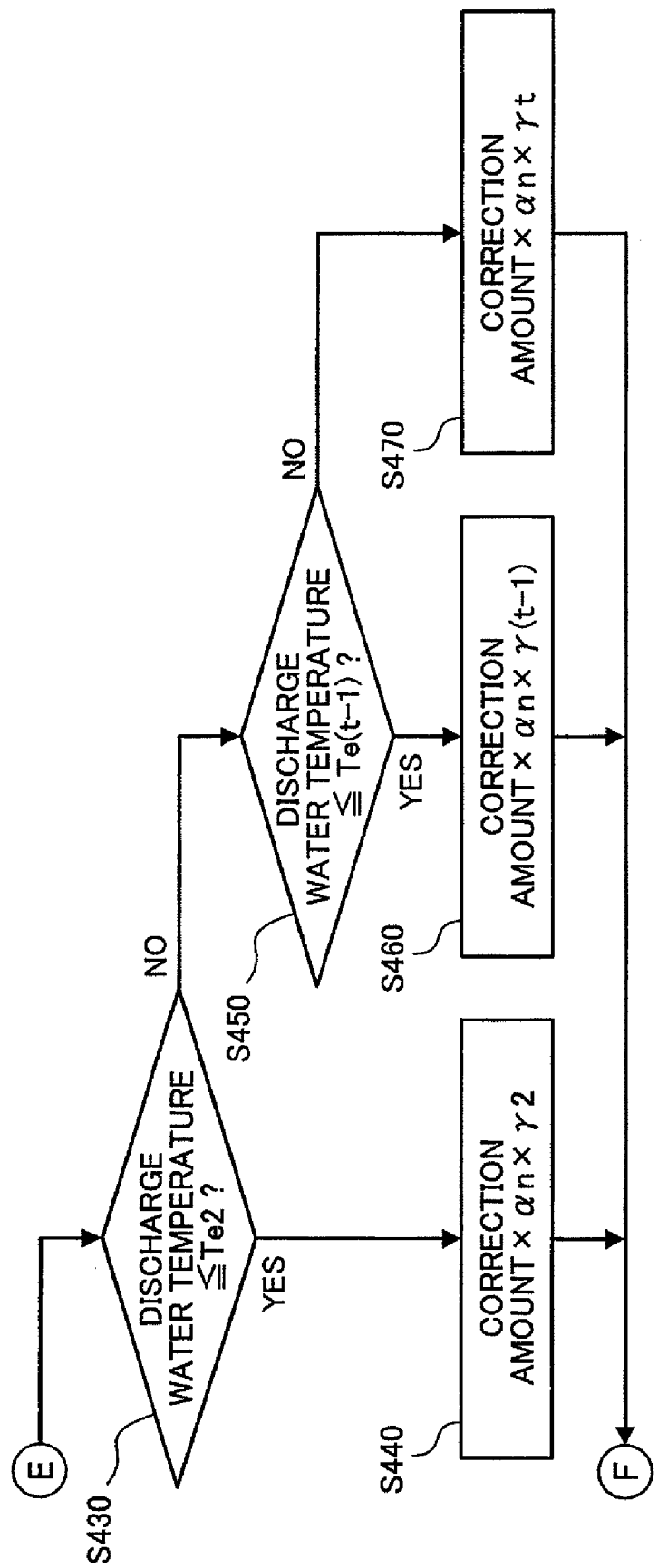

As shown in FIG. 13A and FIG. 13B, in the discharge water temperature control in this mode, after the calculation processing of the correction amount applied to the valve control signal (S200), the confirmation processing of the number of times of correction is performed (S400). Due to such processing, the first adjustment coefficient which is set corresponding to the number of times of correction is determined. Here, the explanation is made assuming a case where the number of times of correction is n times (when the first adjustment coefficient is $\alpha n$).

Then, in the adjustment of the correction amount, the multiplication with the third adjustment coefficient corresponding to the detection temperature is performed. That is, the correction amount which is multiplied by $\alpha n$ which is the first adjustment coefficient is multiplied by the third adjustment coefficient corresponding to the discharge water temperature detected by the mixed water thermistor 22. Here, the explanation is made assuming that the detection temperature is divided into a plurality of temperature ranges with an upper limit temperature Tet (t=1, 2, 3, . . . ). Further, the third adjustment coefficient used in the respective temperature ranges is set to $\gamma t$ (t=1, 2, 3, . . . ).

That is, when the discharge water temperature detected by the mixed water thermistor 22 falls within the temperature range with Te1 set as an upper limit as shown in FIG. 13A and FIG. 13B, the correction amount calculated in the above-mentioned step S200 is multiplied by the first adjustment coefficient $\alpha n$ and the third adjustment coefficient $\gamma 1$ (S410, S420). Then, a correction amount multiplied by the third adjustment coefficient $\gamma 1$ in addition to the first adjustment coefficient $\alpha n$ is outputted to the mixing valve unit 30 as a valve control signal (S500).

In the same manner, when the discharge water temperature detected by the mixed water thermistor 22 falls within the temperature range with Te2 set as an upper limit, the correction amount calculated in the above-mentioned step S200 is multiplied by the first adjustment coefficient $\alpha n$ and the third adjustment coefficient $\gamma 2$ (S430, S440), and a correction amount multiplied by $\alpha n$ and $\gamma 2$ is outputted to the mixing valve unit 30 as a valve control signal (S500). The adjustment corresponding to each temperature range with respect to the correction amount outputted to the mixing valve unit 30 as a valve control signal is performed corresponding to the preset number of temperature ranges (t) (S450, S460, S470).

By adopting the discharge water temperature control of this mode, the adjustment of the correction amount is performed corresponding to the detection temperature by the mixed water thermistor 22. Due to such adjustment, in the discharge water temperature control, an optimum control can be performed in conformity with the detection temperature (temperature range) so that it is possible to readily bring the discharge water temperature to the predetermined temperature with respect to the respective detection temperatures (temperature range). As a result, it is possible to make the occurrence of hunching of the discharge water temperature difficult thus giving a further comfortable use feeling to a user of the washbowl cabinet 2.

Here, a value of the third adjustment coefficient used in the adjustment of the correction amount is not particularly limited in the same manner as the second adjustment coefficient, and may be suitably set corresponding to temperature conditions, pressure conditions or the like on a site where the washbowl cabinet 2 is installed.

Further, the water-and-hot-water mixing device 1 of this embodiment may preferably adopt the constitution that the spindle angle (valve control signal) in a state where the position of the valve element 34 of the mixing valve unit 30 is corrected corresponding to the predetermined temperature by the previously-mentioned discharge water temperature control is stored each time the correction is made, and the spindle angle is reflected on controls performed by succeeding operations. That is, it is preferable that the water-and-hot-water mixing device 1 possesses a learning function with respect to the spindle angle (valve control signal) in response to the predetermined temperature corresponding to a site where the washbowl cabinet 2 is installed (hereinafter referred to as "valve position learning function").

Figure 14:
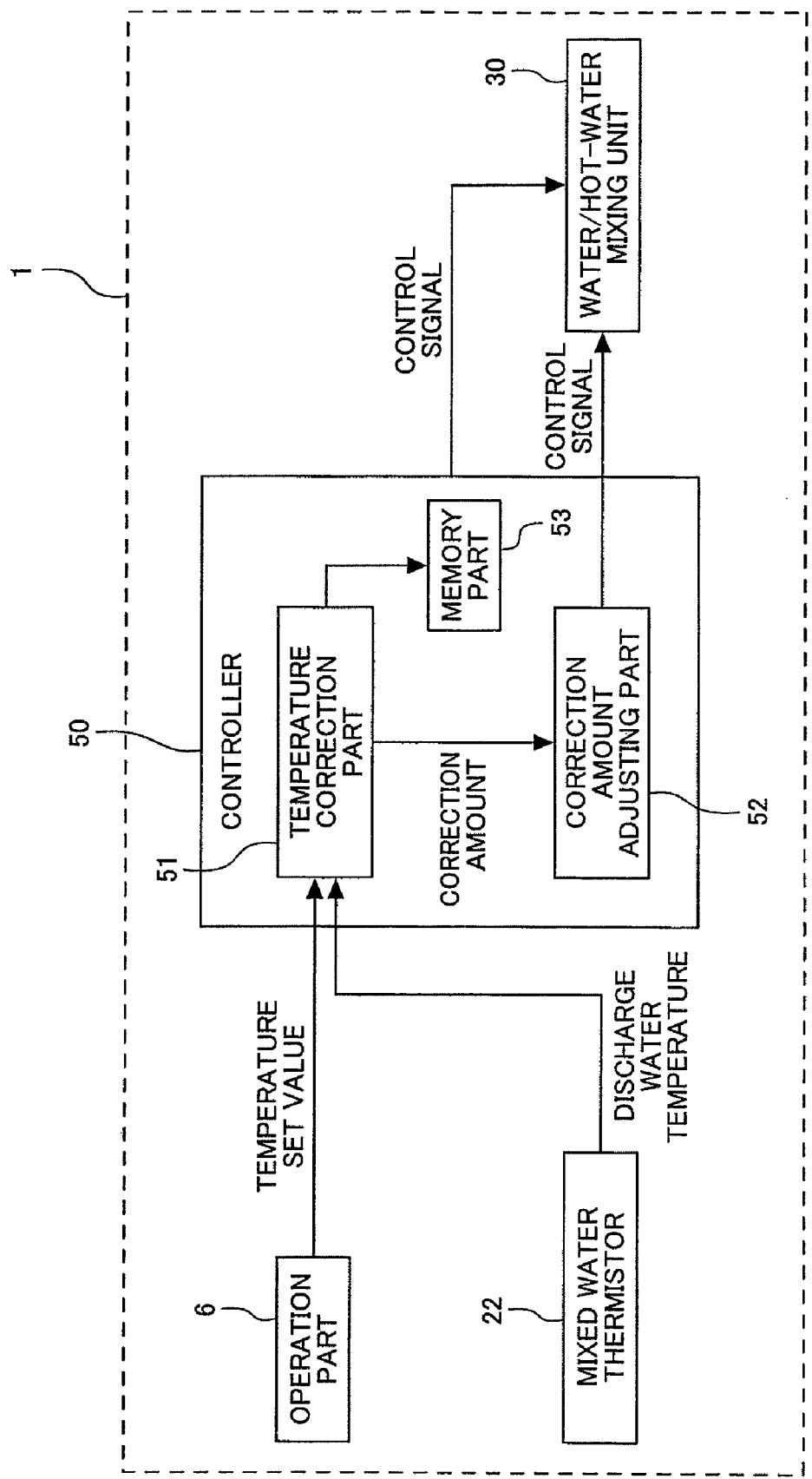
FIG. 14 is a block diagram showing still another example of the constitution of a control part of the water-and-hot-water mixing device according to the first embodiment of the present invention.

As shown in FIG. 14, the controller 50 having the constitution which possesses the valve position learning function further includes a memory part 53 which stores the valve control signal corresponding to the position of the valve element 34 in the valve moving direction when the predetermined temperature and the detection temperature agree with each other. Then, the controller 50, when the predetermined temperature is changed, controls the mixing valve unit 30 based on the valve control signal stored in the memory part 53.

That is, in the controller 50, the memory part 53 stores the position of the valve element 34, that is, the spindle angle (valve control signal) when the discharge water temperature agrees with the predetermined temperature in the relationship with the predetermined temperature. Accordingly, a table indicative of the relationship between the predetermined temperature corresponding to a situation of a site where the washbowl cabinet 2 is installed and the spindle angle is prepared. The table indicative of the relationship between the predetermined temperature and the spindle angle is constantly updated.

Then, when a predetermined temperature becomes the predetermined temperature on which a valve control signal is stored due to a change of the predetermined temperature, the controller 50 controls the mixing valve unit 30 based on the valve control signal stored with respect to the predetermined temperature. That is, when the predetermined temperature is changed, the controller 50 controls the mixing valve unit 30 based on the valve control signal stored in the memory part 53. As a case where the predetermined temperature is changed, a point of time that mixed water is discharged again with a change of the predetermined temperature from a water stop state or a point of time that the predetermined temperature is changed during discharge of mixed water is named.

Figure 15A:
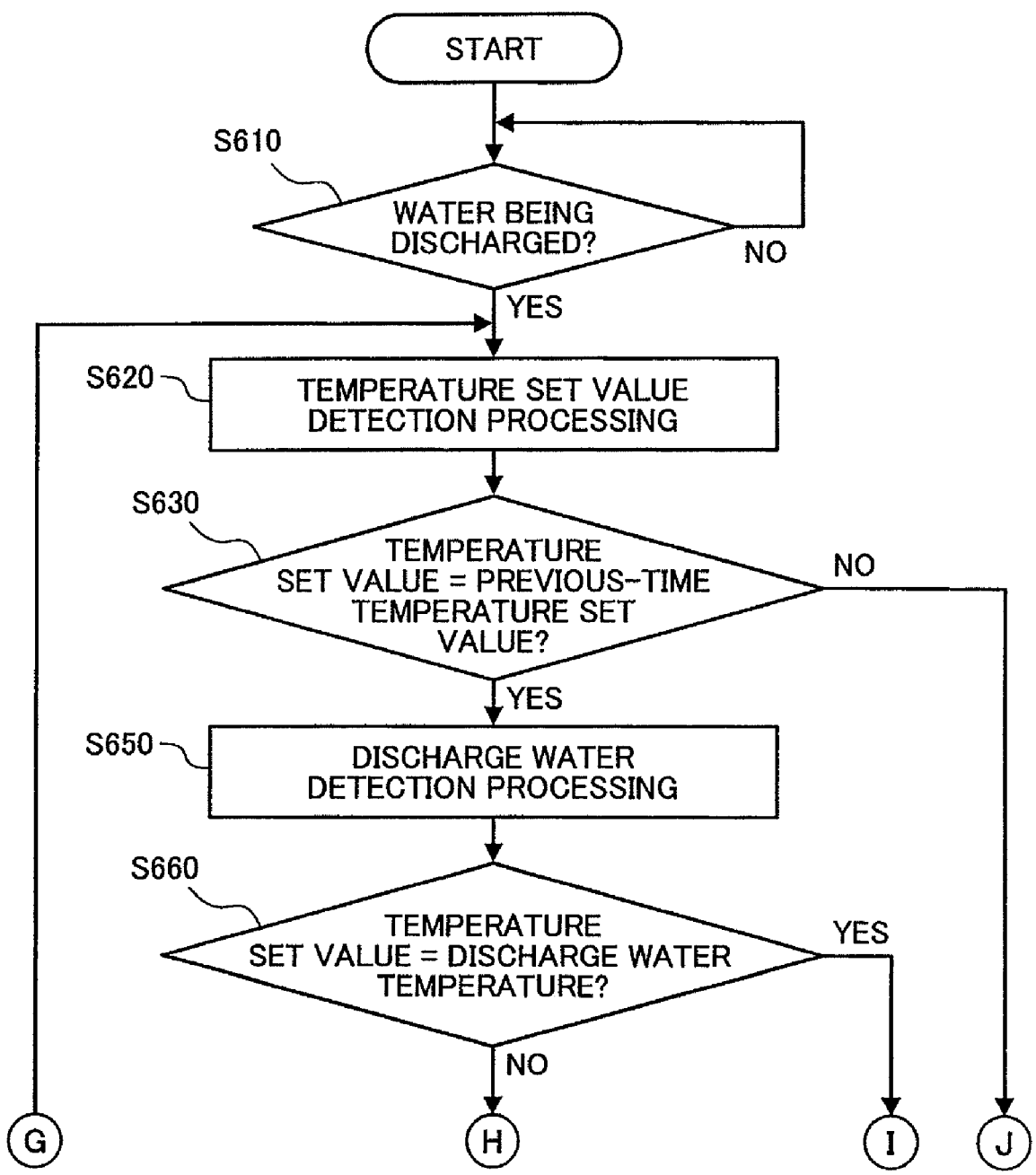
FIG. 15A and FIG. 15B are flowcharts showing still another example of a mixed water temperature control by the water-and-hot-water mixing device according to the first embodiment of the present invention.
Figure 15B:
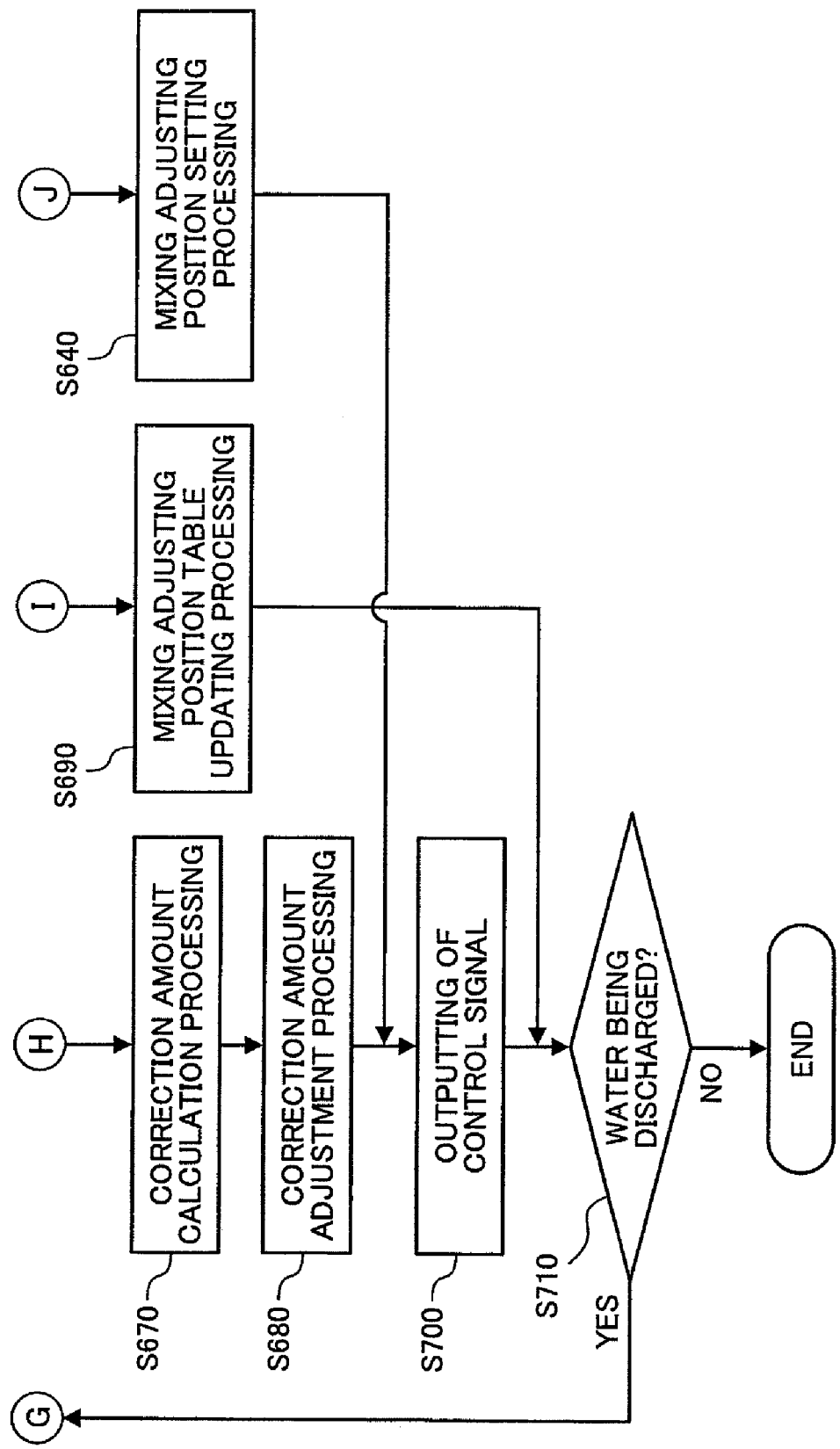

A discharge water temperature control having such a constitution which possesses the valve position learning function is explained in conjunction with a flowchart shown in FIG. 15A and FIG. 15B. As shown in FIG. 15A, in the discharge water temperature control having such a constitution, first of all, it is determined whether or not mixed water is being discharged (S610). This determination is performed by the controller 50 in response to a control signal outputted to the solenoid valve 19 (see FIG. 2). Then, in a discharge water state, firstly, detection processing of a temperature set value is performed (S620). That is, the controller 50 detects the predetermined temperature in response to an operation signal inputted from the operation part 6 in the temperature correcting part 51.

Next, it is determined whether or not the temperature set value detected in step S620 is equal to the previous-time temperature set value (S630). That is, the controller 50 determines whether or not this-time temperature set value (the temperature set value detected in step S620) is equal to the temperature set value before the water discharge where it is determined that mixed water is being discharged in step S610 is started or the temperature set value before the this-time predetermined temperature is set when the predetermined temperature is changed after water discharge is started.

When it is determined that the temperature set value is not equal to the previous-time temperature set value in step S630, setting processing of the mixing adjustment position is performed (S640). Here, a valve control signal is generated for bringing a position of the valve element 34 having a spindle angle corresponding to the previous-time temperature set value different from this-time temperature set value into a position having a spindle angle corresponding to this-time temperature set value. To be more specific, a valve control signal corresponding to this-time temperature set value is generated based on a predetermined temperature curve G1 which is preliminarily set and stored in the controller 50 (see FIG. 8).

Then, the valve control signal generated in step S640 is outputted to mixing valve unit 30 (S700). Accordingly, the spindle angle assumes a value corresponding to the this-time temperature set value. In this manner, setting processing of the mixing adjustment position (S640) is performed and the spindle angle assumes the value corresponding to the this-time temperature set value and hence, unless the temperature set value is changed, in the determination (S630) after next-time temperature set value detection processing (S620), the this-time temperature set value is determined to be equal to the previous-time temperature set value.

When it is determined that the temperature set value is equal to the previous-time temperature set value in step S630, detection processing of discharge water temperature is performed (S650). That is, the controller 50 recognizes discharge water temperature based on a detection signal inputted from the mixed-water thermistor 22 in the temperature correcting part 51.

Subsequently, it is determined whether or not the temperature set value and the discharge water temperature are equal (S660). That is, the controller 50 determines whether or not the detection temperature is equal to the predetermined temperature in the temperature correcting part 51. Here, when it is determined that the detection temperature is not equal to the predetermined temperature, the above-mentioned correction-amount calculation processing (S670) and the correction-amount adjusting processing (S680) in response to the valve control signal are performed and, thereafter, a valve control signal is outputted to the mixing valve unit 30 (S700).

On the other hand, when it is determined that the detection temperature is equal to the predetermined temperature in step S660, updating processing of the mixing adjustment position table is performed (S690). That is, a spindle angle in a state where the detection temperature is equal to the predetermined temperature is adopted as a spindle angle corresponding to the predetermined temperature which conforms to a situation of such a site, and a table which shows the relationship with the predetermined temperature is updated. Updated contents of the table indicative of the relationship between the predetermined temperature and the spindle angle are constantly stored in the memory part 53.

The content of the table updated in step S690, that is, the valve control signal stored in the memory part 53 is subject to setting processing of the mixing adjustment position in step S640. That is, in generating the valve control signal in step S640, when the spindle angle corresponding to the this-time temperature set value is present by the updating processing in step S690, the valve control signal corresponding to the spindle angle is adopted with priority for the valve control signal based on the predetermined temperature curve GI (see FIG. 8) which is preliminarily set and stored by the controller 50. That is, the mixing valve unit 30 is controlled based on the valve control signal corresponding to the newest spindle angle where the discharge water temperature becomes the predetermined temperature corresponding to a situation of a site where the washbowl cabinet 2 is installed. Accordingly, the case where the predetermined temperature is changed using the valve control signal stored in the memory part 53 as described previously corresponds to the case where the temperature set value is determined not equal to the previous-time temperature set value in step S630. A series of processing described above is continuously performed during water discharge (S710).

In this manner, the water-and-hot-water mixing device 1 of this embodiment possesses the valve position learning function and hence, when the predetermined temperature and discharge water temperature agree with each other once in the discharge water temperature control, succeeding times including the next time, to be more specific, at a point of time that mixed water is discharged with a change of the predetermined temperature from a water stop state or at a point of time that the predetermined temperature is changed during the water discharge, it is possible to start a control from a state where the discharge water temperature is closer to the predetermined temperature. Accordingly, it is possible to shorten time necessary for bringing an actual discharge water temperature to the predetermined temperature and, at the same time, it is possible to more effectively suppress hunching of the discharge water temperature thus affording comfortable use feeling to a user of the washbowl cabinet 2.

In the explanation of the constitution which possesses the valve position learning function, as the constitution of the control which the water-and-hot-water mixing device 1 includes, as shown in FIG. 14, the constitution which multiplies the correction amount in the adjustment of the correction amount by only the first adjustment coefficient to is used as an example (see FIG. 7). However, the constitution of the control which the water-and-hot-water mixing device 1 includes is not limited to such an example. That is, as the constitution which possesses the valve position learn function, the constitution which multiplies the correction amount in the adjustment of the correction amount by the second adjustment coefficient in addition to the first adjustment coefficient (see FIG. 10) or the constitution which multiplies the correction amount in the adjustment of the correction amount by the third adjustment coefficient in addition to the first adjustment coefficient (see FIG. 12) may be also applicable in the same manner.

An example a discharge water control of the present invention is explained hereinafter. This example is directed to a change with time of discharge water temperature after starting the control of the discharge water temperature. Further, in this embodiment, Tx° C. is set as a predetermined temperature. Further, in this embodiment, the correction is made at time intervals of approximately 5 seconds.

Figure 16A:
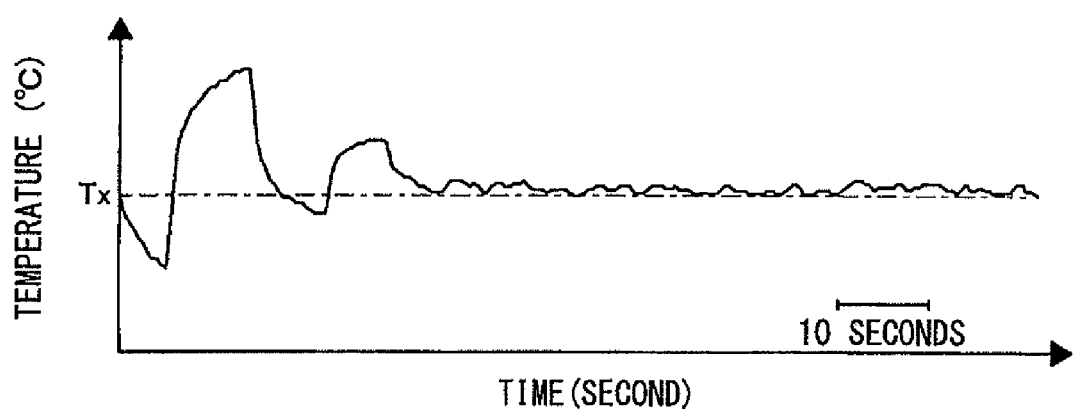
FIG. 16A and FIG. 16B are views showing a change of discharge water temperature with time according to the first embodiment of the present invention and a change of discharge water temperature with time of a comparison example.
Figure 16B:
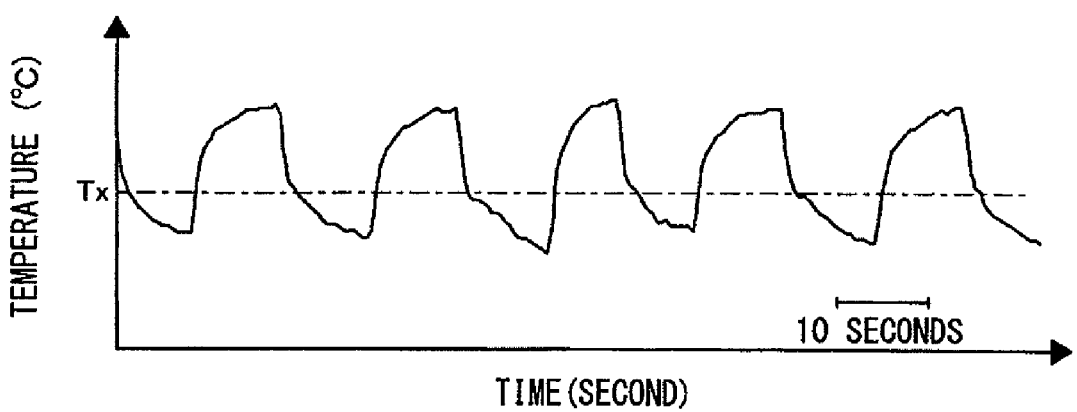

FIG. 16A shows a change with time of the discharge water temperature according to this embodiment. That is, a graph shown in FIG. 16A expresses a change with time of the discharge water temperature when the adjustment of the correction amount is performed using the first adjustment coefficient in the discharge water temperature control. FIG. 16B shows a change with time of discharge water temperature according to a comparison example which is adopted as an object to be compared with this embodiment. This comparison example expresses a change with time of discharge water temperature when the adjustment of the correction amount is not performed under the similar condition as this embodiment, that is, when a value of 100% is always used based on a predetermined temperature curve which is preliminarily set with respect to the correction amount (see a predetermined temperature curve G1 in FIG. 8).

As shown in FIG. 16B, in the comparison example, an unstable state in which the discharge water temperature fluctuates up and down regularly with respect to the predetermined temperature Tx° C., that is, hunching of discharge water temperature is generated. To be more specific, each time the correction based on the correction amount is performed, the spindle angle fluctuates in the normal and reverse directions with approximately uniform amplitude by way of an angle corresponding to the predetermined temperature Tx° C. Such hunching of the discharge water temperature gives a discomfort to a user of a washbowl cabinet or the like.

To the contrary, in this embodiment, as shown in FIG. 16A, in an initial stage of a time range shown in the drawing (see a left-side portion of the graph), although the discharge water temperature fluctuates up and down with respect to the predetermined temperature Tx° C., the discharge water temperature converges to a value close to the predetermined temperature Tx° C. within a relatively short time. That is, in this embodiment, the discharge water temperature is readily corrected to the target temperature (predetermined temperature) and becomes stable without generating hunching of the discharge water temperature recognized in the comparison example.

As can be understood from the example of the present invention described above, according to the water-and-hot-water mixing device of the present invention, in the constitution which performs the feedback control based on the discharge water temperature using the thermo-valve, it is possible to acquire advantageous effects that the generation of hunching of the discharge water temperature is suppressed thus imparting comfortable use feeling to a user of a washbowl cabinet or the like.

Second Embodiment

Figure 17:
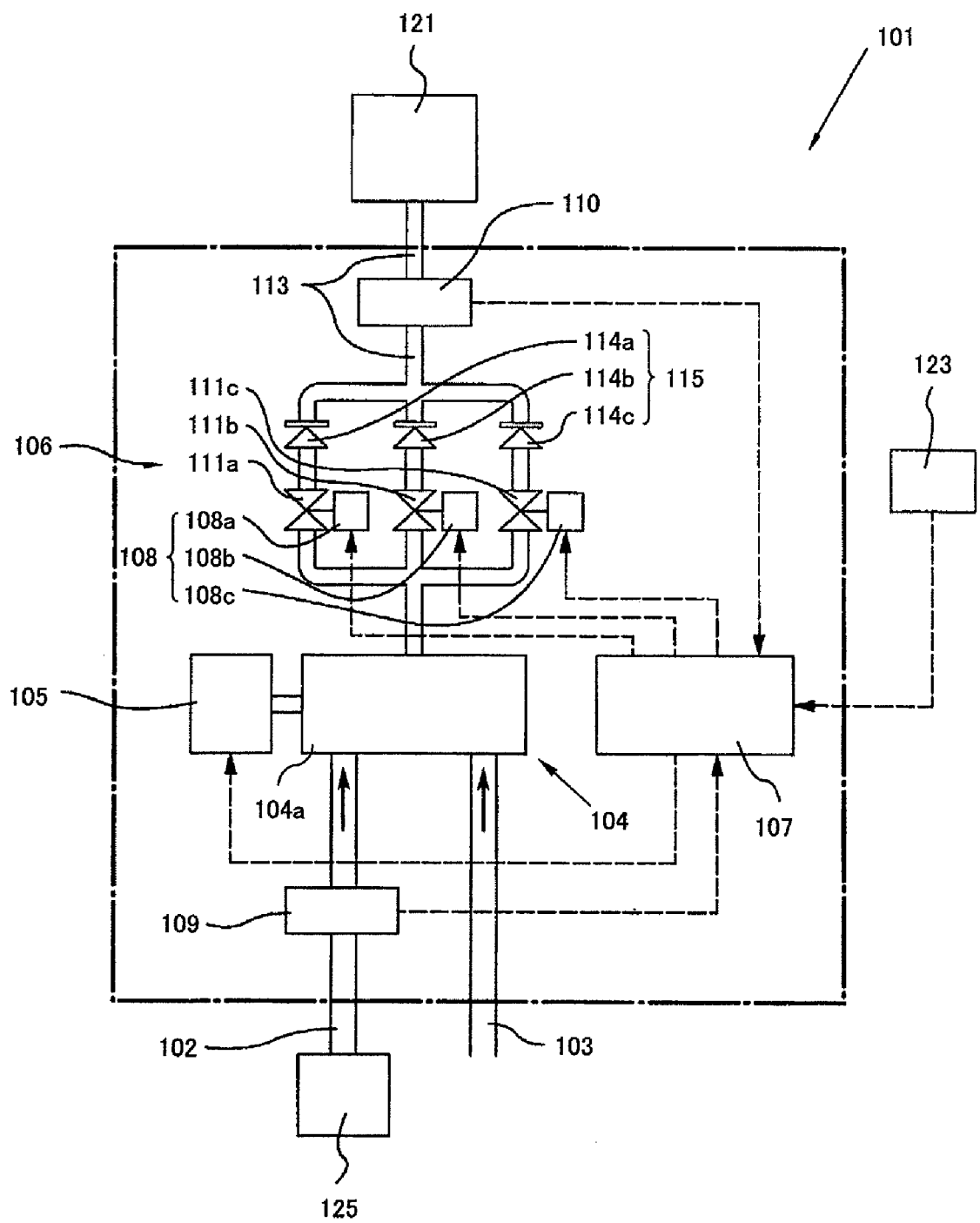
FIG. 17 is a block diagram showing the constitution of the water-and-hot-water mixing device according to the second embodiment of the present invention.

FIG. 17 shows the constitution of a water-and-hot-water mixing device 101 according to the second embodiment of the present invention.

As shown in FIG. 17, in this embodiment, the water-and-hot-water mixing device 101 includes a hot-water supply pipe 102 communicated with a hot water supply unit 125 and a water supply pipe 103 which is connected with service water not shown in the drawing. Distal ends of the respective pipes 102, 103 are communicated with a mixing valve unit 104. The mixing valve unit 104 includes a thermo-valve 104a and a motor 105 which drives the thermo-valve 104a.

As shown in FIG. 17, a flow rate adjusting functional part 106 is arranged downstream of the mixing valve unit 104 in a communicable manner with the mixing valve unit 104, while a faucet body 121 is arranged downstream of the flow rate adjusting functional part 106 in a communicable manner with the flow rate adjusting functional part 106. An operation part 123 is connected to a controller 107, and an output part of the controller 107 is connected to the motor 105 of the mixing valve unit 104 and an open/close valve drive device 108 of the flow rate adjusting functional part 106 respectively.

A hot-water thermistor 109 is mounted on a middle portion of the hot-water supply pipe 102, and a mixed-water thermistor 110 is mounted on a middle portion of a discharge water pipe 113 arranged between the flow rate adjusting functional part 106 and the faucet body 121. The hot-water thermistor 109 and the mixed-water thermistor 110 are connected to an input part of the controller 107 respectively.

The flow rate adjusting functional part 106 is formed of an open/close valve drive unit 108 arranged on an upstream side which is constituted of three open/close valves 111a, 111b, 111c and open/close valve drive mechanisms 108a, 108b, 108c, and a constant flow rate valve device 115 which is constituted of three constant flow rate valves 114a, 114b, 114c. Three respective open/close valves 111a, 111b, 111c and three respective constant flow rate valves 114a, 114b, 114c are communicated with each other based on one-to-one relationship. In an operation of the water-and-hot-water mixing device 101, a flow rate of mixed water becomes smallest when only one open/close valve 111a of a small flow rate is opened, and a flow rate of mixed water becomes largest when all three one open/close valves 111a, 111b, 111c are opened. By performing an open/close valve operation by properly selecting the open/close valves 111a, 111b, 111c corresponding to a predetermined flow rate, it is possible to adjust the flow rate of mixed water in three stages.

In the same manner as the water-and-hot-water mixing device 1 of the first embodiment, in the water-and-hot-water mixing device 101 of the second embodiment, a feedback control is applied to a drive control of the mixing valve unit 104 such that a mixed water data signal detected by the mixed-water thermistor 110 and a hot water data signal detected by the hot-water thermistor 109 are inputted to the control unit 107, a comparison calculation of the input data signals with predetermined temperature data set by the operation part 123 is performed, and driving of the motor 105 of the mixing valve unit 104 is controlled based on a result of the comparison calculation thus making the mixed water discharged from the faucet body 121 have the predetermined temperature.

Also in this second embodiment, in the same manner as the water-and-hot-water mixing device 1 of the first embodiment, the controller 107 is configured to start the feedback control when the controller 107 determines that a change amount of the temperature of the hot water per unit time detected by the hot-water thermistor 109 is not more than a fixed value and the temperature of the hot water detected by the hot-water thermistor 109 is not lower than the predetermined temperature.

Due to such a control, the water-and-hot-water mixing device 101 can make the adjustment time of discharge water temperature as short as possible and, at the same time, can prevent an overshoot phenomenon where high-temperature mixed water is discharged from the mixing valve unit 104.

What is claimed is:

1. A water-and-hot-water mixing device comprising:
   a mixing valve which includes a valve element which is movably arranged in the mixing valve and is configured to regulate openings of respective inflow ports for hot water and water which are supplied to the mixing valve by way of predetermined flow passages corresponding to a position of the valve element in the moving direction of the valve element, and is configured to discharge mixed water made of the hot water and the water obtained by mixing the hot water and the water flown into the mixing valve from the inflow ports;
   a temperature setting operation part which is configured to set a predetermined temperature which is a target value with respect to a temperature of the mixed water;
   a temperature sensor which is configured to detect a temperature of the mixed water flown out from the mixing valve;
   a supply-hot-water temperature sensor which is configured to detect a temperature of the hot water supplied to the mixing valve; and
   a controller which is configured to perform a feedback control for controlling the mixing valve such that mixed water of the predetermined temperature is obtained as the mixed water by outputting a control signal for moving the valve element with respect to the mixing valve based on the predetermined temperature and a temperature of the mixed water detected by the temperature sensor, wherein
   the controller is configured to start the feedback control when the controller determines that a change amount of the temperature of the hot water per unit time detected by a hot-water supply temperature sensor is not more than a fixed value and the temperature of the hot water detected by the hot-water supply temperature sensor is not lower than the predetermined temperature.

2. A water-and-hot-water mixing device comprising:
   a mixing valve which includes a valve element which is movably arranged in the mixing valve and is configured to adjust openings of respective inflow ports for hot water and water which are supplied to the mixing valve by way of predetermined flow passages corresponding to a position of the valve element in the moving direction of the valve element and a temperature sensing member which is configured to drive the valve element by applying a biasing force which is changed along with a temperature change of the mixed water obtained by mixing the hot water and the water flown into the mixing valve from the inflow ports to the valve element, and is configured to discharge the mixed water;
   a temperature setting operation part which is configured to set a predetermined temperature which is a target value with respect to a temperature of the mixed water;
   a temperature sensor which is configured to detect a temperature of the mixed water flown out from the mixing valve;
   a supply-hot-water temperature sensor which is configured to detect a temperature of the hot water supplied to the mixing valve; and
   a controller which is configured to perform a feedback control for controlling the mixing valve such that mixed water of the predetermined temperature is obtained as the mixed water by outputting a control signal for moving the valve element with respect to the mixing valve based on the predetermined temperature and a temperature of the mixed water detected by the temperature sensor, wherein
   the controller is configured to start the feedback control when the controller determines that a change amount of the temperature of the hot water per unit time detected by a hot-water supply temperature sensor is not more than a fixed value and the temperature of the hot water detected by the hot-water supply temperature sensor is not lower than the predetermined temperature.

3. A water-and-hot-water mixing device according to claim 2, wherein the controller includes:
   a temperature correcting part which is configured to calculate a correction amount applied to the control signal which corresponds to the predetermined temperature corresponding to a magnitude of the difference between the predetermined temperature and a temperature detected by the temperature sensor based on an operation signal from the temperature setting operation part corresponding to the predetermined temperature and a detection signal from a temperature sensor such that the difference between the predetermined temperature and the temperature detected by the temperature sensor is decreased; and
   a correction amount adjusting part which is configured to adjust the correction amount by multiplying the correction amount by a predetermined coefficient corresponding to the number of calculation of the correction amount for every calculation of the correction amount by the temperature correcting part.

4. A water-and-hot-water mixing device according to claim 3, wherein the controller further includes a memory part which is configured to store the control signal corresponding to a position of the valve element in the predetermined direction where the predetermined temperature and the temperature detected by the temperature sensor agree with each other, and the controller is configured to control the mixing valve based on the control signal stored in the memory part when the predetermined temperature is changed.

5. A water-and-hot-water mixing device according to claim 3, wherein the correction amount adjusting part further multiplies the correction amount which is multiplied by the predetermined coefficient by a predetermined coefficient corresponding to a value of the predetermined temperature.

6. A water-and-hot-water mixing device according to claim 5, wherein the controller further includes a memory part which is configured to store the control signal corresponding to a position of the valve element in the predetermined direction where the predetermined temperature and the temperature detected by the temperature sensor agree with each other, and the controller is configured to control the mixing valve based on the control signal stored in the memory part.

7. A water-and-hot-water mixing device according to claim 3, wherein the correction amount adjusting part further multiplies the correction amount which is multiplied by the predetermined coefficient by a predetermined coefficient corresponding to a temperature detected by the temperature sensor.

8. A water-and-hot-water mixing device according to claim 7, wherein the controller further includes a memory part which is configured to store the control signal corresponding to a position of the valve element in the predetermined direction where the predetermined temperature and the temperature detected by the temperature sensor agree with each other, and the controller is configured to control the mixing valve based on the control signal stored in the memory part when the predetermined temperature is changed.

* * * * *